US012579725B1

(12) United States Patent
Achim et al.

(10) Patent No.: US 12,579,725 B1
(45) Date of Patent: Mar. 17, 2026

(54) CAMERA-INVARIANT 3D PROPERTY FORMULATION

(71) Applicant: Helm.ai, Inc., Menlo Park, CA (US)

(72) Inventors: Tudor Stefan Achim, Menlo Park, CA (US); Onur Ozyesil, Princeton, NJ (US); Vladislav Voroninski, Redwood City, CA (US); Christopher Blake Melgaard, Seattle, WA (US); Ryan Halabi, Colorado Springs, CO (US)

(73) Assignee: Helm.ai, Inc., Redwood City, CA (US)

( * ) Notice: Subject to any disclaimer, the term of this patent is extended or adjusted under 35 U.S.C. 154(b) by 0 days.

(21) Appl. No.: 18/540,200

(22) Filed: Dec. 14, 2023

Related U.S. Application Data

(60) Provisional application No. 63/432,964, filed on Dec. 15, 2022.

(51) Int. Cl.
*G06T 7/70* (2017.01)
*G06T 15/00* (2011.01)
*G06V 20/58* (2022.01)

(52) U.S. Cl.
CPC ............... *G06T 15/00* (2013.01); *G06T 7/70* (2017.01); *G06V 20/58* (2022.01)

(58) Field of Classification Search
CPC ............... G06T 7/70–77; G06V 10/82; G06V 20/56–58
See application file for complete search history.

(56) References Cited

U.S. PATENT DOCUMENTS

| | | | |
|---|---|---|---|
| 11,257,272 B2 | 2/2022 | Rowell | |
| 2021/0264196 A1* | 8/2021 | Abbeloos | G06V 20/58 |
| 2021/0383167 A1* | 12/2021 | Chakravarty | G06V 20/58 |
| 2021/0398351 A1* | 12/2021 | Papandreou | G06N 3/08 |
| 2022/0415178 A1* | 12/2022 | Shibata | G01S 13/931 |
| 2023/0281847 A1 | 9/2023 | Yiran | |
| 2023/0351625 A1 | 11/2023 | Hughes | |
| 2024/0371082 A1 | 11/2024 | Ankit | |

* cited by examiner

*Primary Examiner* — Ryan McCulley
(74) *Attorney, Agent, or Firm* — Van Pelt, Yi & James LLP

(57) ABSTRACT

Determining an absolute depth estimate of a vehicle object in a 2D image captured by a camera includes receiving the 2D image captured by the camera. It further includes determining, at least in part by using a segmentation model, a plurality of pixels corresponding to the vehicle object in the 2D image. It furhter includes using a prediction model to determine, for each pixel in the plurality of pixels determined at least in part by using the segmentation model, a correspondng camera invariant distance value comprising a predicted height of a cross-section of the vehicle object that is visible within a given pixel. It further includes determining the absolute depth estimate of the vehicle object in the 2D image based on: a focal length of the camera that captured the 2D image; and an aggregation of the predicted heights determined for each of the pixels in the plurality of pixels.

4 Claims, 15 Drawing Sheets

250

312

Image captured on camera on vehicle (e.g. with Sekonix camera AR0521)

314

Image copied to GPU memory (e.g. nvMedia)

316

Network processes image to produce per-pixel camera-invariant predictions (e.g. with Tensorflow)

318

Per-object aggregation on CPU (e.g. with C++)

320

Object distance measurements used in planning (e.g. with object-level sensor fusion)

350

Start

Receive a 2D image captured by a camera ~352

Provide the 2D image to a prediction model configured to predict a quantity that is invariant to parameters of the camera ~354

Determine a 3D property of an object in the 2D image based on a camera parameter and the predicted quantity that is invariant to parameters of the camera ~356

End

CAMERA-INVARIANT 3D PROPERTY FORMULATION

CROSS REFERENCE TO OTHER APPLICATIONS

This application claims priority to U.S. Provisional Patent Application No. 63/432,964 entitled CAMERA-INVARIANT 3D PROPERTY FORMULATION filed Dec. 15, 2022 which is incorporated herein by reference for all purposes.

BACKGROUND OF THE INVENTION

Estimating properties of objects such as vehicles and pedestrians is an important task for computer vision for autonomous driving. However, performing such estimation can be challenging given the diversity and disparate types of imaging sensor equipment. Improved techniques for estimating properties of objects would be beneficial.

BRIEF DESCRIPTION OF THE DRAWINGS

Various embodiments of the invention are disclosed in the following detailed description and the accompanying drawings.

DETAILED DESCRIPTION

Figure 1:
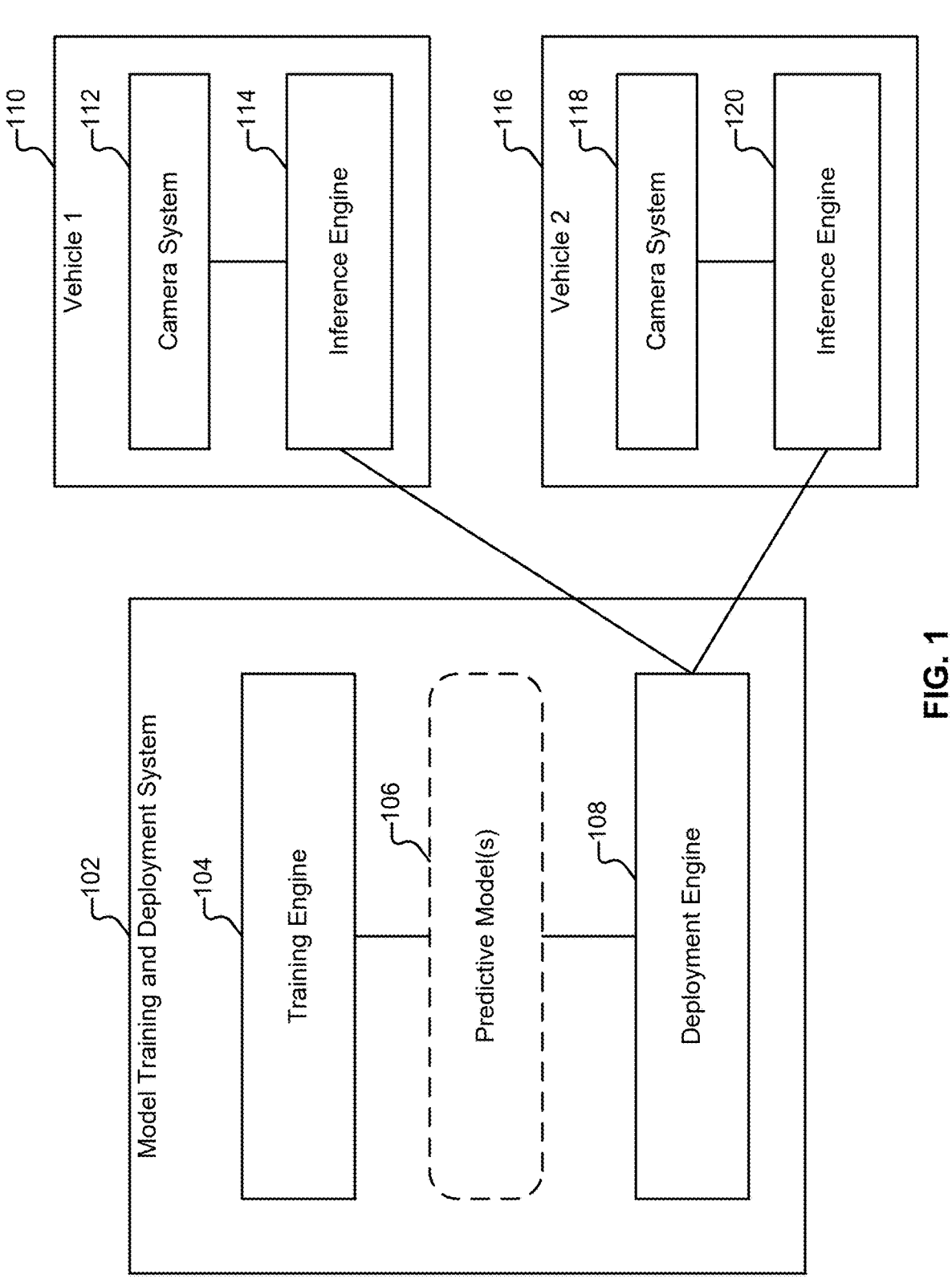
FIG. 1 illustrates an embodiment of a system for training, deploying, and using predictive models for estimating camera-invariant quantities that are usable to determine absolute 3D object properties.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein are embodiments of techniques for camera-invariant 3D (three-dimensional) property formulation.

Computer vision for autonomous driving includes a variety of components. One function of the perception component is to detect objects such as vehicles and pedestrians, as well as to estimate where those objects are in the coordinate frame of the camera, as well as other 3D properties such as the orientation of the minimal 3D bounding boxes encompassing the objects. One example type of task is referred to as the "detection task," and another type of task is referred to herein as the "3D tasks."

Given the raw color sensor readings (e.g., RGB pixel values) from an imaging sensor such as a camera, it is possible to solve the detection task in an identifiable way, because the visual appearance of objects is relatively unambiguous independently of the parameters of the camera apparatus, such as its focal length. For example, given an image of a car taken from close by with a phone camera, and an image of the same car taken from far away (e.g., on the order of miles) with a telescopic lens, the appearance of the car will be largely unchanged.

However, although the car appears or looks the same in both images, the distance of the vehicle to the camera (where the distance is an example of a 3D property of the car object to be estimated) is drastically different between the two camera capture setups. A naïve application of deep learning to the task of estimating distance to vehicles based on the image (e.g., 2D RGB image) would fail because the task given to the neural network is ill-posed; the deep learning model cannot know the distance to the vehicle without further information about the camera configuration/parameters.

Described herein are embodiments of techniques for resolving such issues, including by recasting or structuring the prediction problem (what is to be predicted) in a camera-invariant manner. In some embodiments, during the training process (embodiments of which will be described in further detail below), the 3D properties to be predicted are transformed using embodiments of an invertible mathematical function to a new set of quantities that can be determined unambiguously from the sensor readings (e.g., 2D RGB images). Further embodiments of implementations of the transformations are described below.

Embodiments of a framework for generating (e.g., training) and deploying predictive models for estimating 3D properties of objects at inference time (for 3D project estimation for objects in real-time) are described in further detail below.

Examples of 3D properties to be estimated for objects (e.g., vehicles) captured in images in the context of autonomous driving are the orientation of the object (relative to the image recording system of the ego vehicle that captured the image), and the distance of the object (relative to the ego vehicle). Determining such 3D properties of objects facilitates various aspects of autonomous driving, such as path planning. For example, the ego vehicle is a vehicle that includes various sensors (e.g., camera system) to measure and perceive the environment or surroundings of the vehicle, where 3D properties of objects in the ego vehicle's environment are measured relative to the ego vehicle.

Determining the absolute value of a 3D property of an object from how it appears in a 2D image would require knowledge of the parameters of the camera that took the 2D image (e.g., its focal length, field of view, etc.).

In one estimation approach, a machine learning model or neural network is trained to directly estimate an absolute value of a 3D property from images captured by a specific camera with a specific set of camera parameters (e.g., using training data images captured using the specific camera configuration) or fixed camera setup. Different models for estimating the 3D property are trained for different types of cameras/camera configurations. The individual models that are pre-trained for specific camera configurations would then be specifically deployed to those vehicles with matching camera configurations. There are various challenges for such an approach. For example, training of a camera-specific model would limit the training image set to those images captured by the corresponding camera configuration. This would limit the accuracy of the predictions that the model could determine. Further, even for the same type of camera, different models would have to be trained for different parameters such as focal length, field of view, etc. Another issue with such an approach is in deployment of such models. A model trained for a specific imaging configuration would be limited to being deployed to vehicles with the same imaging configuration. This would limit a model's applicability. Further, in addition to the diversity in camera parameters (e.g., field of view, zoom, pixel focal length, etc.), there is also diversity in the way that cameras are mounted in vehicles (e.g., at the front, rear, or side of the car, at an angle, etc.). Training individual models tailored for specific sets of camera parameters and mounting configurations would be intractable. Further, if the imaging configuration of a vehicle were updated (e.g., because a new camera was installed, a different zoom was used, the position in which the camera was mounted was changed), a new model would have to be trained and deployed to ensure accurate predictions were being made given the updated camera configuration/changed camera mounting configuration.

In some embodiments, using the techniques described herein, rather than training a model to predict a 3D property of an object given a specific camera configuration, the prediction task is structured such that a predication model is trained to estimate a camera-invariant value associated with the 3D property of interest, where the prediction model is not reliant on knowledge of parameters of the camera to make its camera-invariant predictions. Rather, the prediction model can make its prediction based on the features of the image itself. In some embodiments, this is an intermediate step to the ultimate goal of determining the absolute value of the 3D property. For example, after the camera-invariant value is computed, the absolute 3D property for the object is recovered by applying the parameters of the imaging system to the camera-invariant value. In some embodiments, the camera-invariant value associated with a 3D property is determined according to a function, such as an invertible transformation, that facilitates recovery of the actual absolute 3D property by applying camera properties to the camera-invariant version of the 3D property.

This type of structured prediction, in which camera-invariant values associated with a 3D property are determined, and a model is trained to predict such camera-invariant values, provides various benefits. For example, the available training set of images is expanded. Rather than being limited to training data from specific cameras with specific camera parameters, images from any type of camera may be used. Expanding the available training data set that the model can be trained on improves the accuracy of the predictions made by the model. As another example benefit, using a normalized representation of a 3D property or a camera-invariant quantity as described herein reduces biases in training data that are difficult to correct after the fact. As yet another benefit, a model trained to compute a camera-invariant property is universally applicable and deployable across multiple types of camera systems, without requiring building new models from scratch, or with minimal additional fine-tuning or retraining. For example, in order to make a model that is deployable to various vehicles with disparate (and unknown) camera systems, the models described herein are designed or structured to make predictions that are not reliant or require knowledge of camera systems to make the prediction. For example, the models described herein are designed to predict values or quantities that are invariant to camera parameters. Further, the models are designed to generate the camera-invariant predicted values without requiring camera parameters as input when making inferences. Using the techniques described herein, a single, highly-accurate model for 3D property estimation can be deployed to any vehicle with any imaging sensor configuration. Multiple individual models for different types of camera configurations need not be trained. For example, the predictive models described herein are invariant to parameters of the imaging sensors themselves (e.g., to different focal lengths, fields of view, zooms, etc.), as well as invariant or insensitive to the way the cameras are mounted (e.g., whether the cameras are mounted on the side of the vehicle, the rear of the vehicle, the front of the vehicle, at an angle, etc.). Using the techniques described herein, a single model can be trained for multiple different camera configurations (where the model can make its predictions in a manner that is not sensitive to the specific camera configuration of an ego vehicle).

As described above, as a consequence (and benefit) of using the structured prediction techniques described herein, 3D estimation models are trained that work on multiple cameras at the same time, instead of, for example, requiring the many individual models that would be required with existing alternative approaches.

As a further example, suppose that a model is developed for a target entity. The target entity may start out initially with a fixed camera setup that is used to test the model. However, at a later time in the future, the entity may wish to use a more advanced camera system. By using the techniques described herein, rather than having to build a new model from scratch for the updated camera system, the existing model can instead be fine-tuned with additional data pertaining to the advanced camera system. Further, even without the fine-tuning, the existing model will already be able to make reasonable predictions for images from the advanced camera system from the outset (as it is trained to make predictions from the content of 2D RGB images, without requiring camera parameters as input to make the predictions). The ability to fine-tune a model with additional data to improve the accuracy of predictions given a new camera setup is an improvement in the efficiency of improving the accuracy of predictions in light of new camera sources. For example, fine-tuning a model with additional data for the new camera setup is much less time-consuming then having to develop and generate a new individual model that is tailored specifically to the new camera setup (e.g., constrained to only being applicable to that new camera setup). Further, the amount of training data to account for new camera setups to improve the models described herein is decreased (as the existing model, based on its current training, will already be able to generate predictions). As described above, the structured prediction techniques described herein provide benefits such as significantly decreasing training time and the amount of training data needed to fine-tune or update the models described herein.

FIG. 1 illustrates an embodiment of a system for training, deploying, and using predictive models for estimating camera-invariant quantities that are usable to determine absolute 3D object properties.

In this example, model training and deployment system 102 is configured to train predictive models for estimating camera-invariant properties. In some embodiments, training engine 104 is configured to train predictive model(s) 106. Further details regarding model training are described below. Deployment engine 108 is configured to deploy trained predictive models to vehicles (e.g., over a network such as the Internet). For example, instances of the trained models are deployed and installed to vehicles such as vehicle 110 and vehicle 116. In this example, each vehicle includes a camera system (e.g., camera systems 112 and 118) and an inference engine (e.g., inference engines 114 and 120). For example, there is a camera mounted on a vehicle, where the camera is mounted at a fixed position. The camera is configured to sense images of the environment or surroundings of the vehicle. The camera systems of vehicles 110 and 116 may be different, with different camera parameters (e.g., different fields of view, focal lengths, etc.). In some embodiments, instances of a same predictive model (e.g., trained for making normalized depth predictions, camera-invariant relative orientation predictions, or any other type of camera-invariant prediction as appropriate) are deployed to both vehicles 110 and 116. At inference time, each vehicle uses its camera system to take one or more images of its surroundings, such as RGB images (which may be taken from video frames, for example). The inference engine of each vehicle is configured to take as input an image and predict camera-invariant values for the pixels in the image. Based on identification of unique objects within the image, such as a vehicle, the inference engine combines the predicted camera-invariant values with a locally determined or obtained camera parameter (that is known or can be determined locally at the vehicle) to recover or otherwise determine a 3D property of the identified object in the image, relative to the ego vehicle.

As will be described in further detail below, the model training and deployment system is configured to train predictive models to facilitate prediction of 3D properties of objects based on how those objects were captured in a 2D image. In some embodiments, the predictive models are trained to predict camera invariant versions of the 3D properties, where the absolute values of the 3D properties are recovered or converted from the camera invariant values via an invertible transformation function applied at inference time.

In some embodiments, by using the structured prediction techniques described herein, where a predictive model is trained to predict camera-invariant values, 3D estimation models are trained that work on multiple cameras at the same time, rather than having many individual models that would be required with existing alternative approaches.

For example, as will be described in further detail below, the estimation models described herein are trained without requiring prior knowledge (at training time) of the parameters of the camera system that the models will be deployed on. Later, after deployment of the models to vehicles, the inference engine local to the vehicle uses obtained parameters of the camera (because the inference engine is local to the vehicle and can thus obtain camera parameters of the imaging system) to invert or convert (e.g., via a transformation function) camera-invariant values predicted for pixels in a 2D captured image corresponding to an identified object (identified, for example, via a segmentation model) to absolute 3D property values for the identified object. An aggregate 3D property value can then be determined for the identified object.

As will be described in further details below, in some embodiments, the camera-invariant 3D property formulations described herein are used in a pixel-wise prediction context, where a trained model or network, at inference time, predicts the relevant camera-invariant 3D property for each pixel, which are then aggregated across the pixels for an object (determined, for example, using a segmentation model), to produce a final estimate. These invertible transformations may also be applied in more general settings where models or neural networks are producing object estimates directly rather than pixel-wise predictions.

Figure 2A:
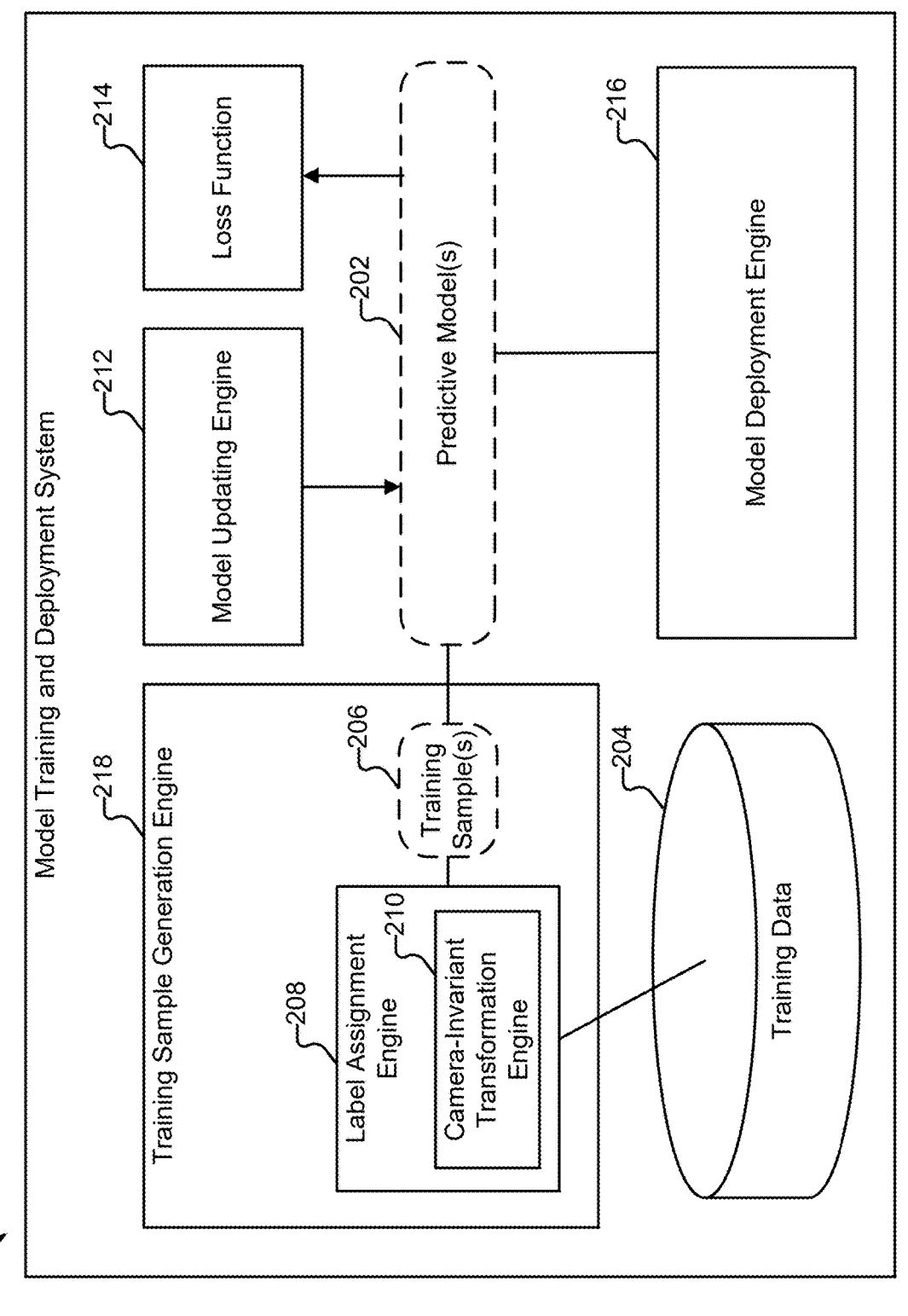
FIG. 2A illustrates an embodiment of a system for training predictive models for estimating camera-invariant 3D properties.

FIG. 2A illustrates an embodiment of a system for training predictive models for estimating camera-invariant 3D properties. In this example, model training and deployment system 200 is configured to train models (predictive models 202) to perform embodiments of the structured prediction described herein. In this example, the data (e.g., training data 204) used to train models for performing such structured prediction include, but are not limited to, images from the following example sources:

Cameras where the intrinsic parameters are known: such as Sony IMX490, Sony IMX390, Sekonix AR0231, etc.

Cameras where the intrinsic properties are not known: such as generic dashcam footage with unknown cameras and mounting positions.

In some embodiments, the training data 204 is generated by collecting images (e.g., RGB images) from various cameras containing vehicles with various 3D properties (e.g., various orientations, distances, etc.) in relation to the ego vehicle (the vehicle with the camera that captured the images). While examples involving making camera-invariant predictions from 2D RGB images are described herein for illustrative purposes, the structured prediction techniques described herein may be variously adapted to generate camera-invariant predictions from any other type of input image, as appropriate.

As described above, examples of cameras or imaging systems from which data is collected include those whose intrinsic parameters are known (e.g., Sony IMX490, Sony IMX390, Sekonix AR0231, etc.) and cameras with unknown intrinsic parameters, such as generic dashcam footage with unknown cameras and mounting positions.

In some embodiments, training sample generation engine 218 is configured to generate training samples 206 by using label assignment engine 208. Label assignment engine 208 is configured to generate a training sample by assigning, to a collected RGB image, an assignment of camera-invariant quantities derived from absolute values of a 3D property. As one example of the processing performed by label assignment engine 208, for each pixel in a collected image corresponding to a vehicle whose orientation/distance is known in an image (e.g., due to additional information such as associated LIDAR (Light Detection and Ranging) information, geometric computations, etc.), using the camera information, location of each pixel, and which other pixels belong to the vehicle, the camera dependent 3D property values are converted, using camera-invariant transformation engine 210, into camera-invariant quantities associated with the 3D property. In some embodiments, a camera-invariant version of a 3D property value is a normalized 3D property value that is normalized with respect to another unit, such as a pixel, a camera parameter (e.g., pixel focal length, field of view, etc.), etc. Another example of a camera-invariant value pertaining to a 3D property is a relative orientation value determined from an absolute orientation value. Examples of transformation and conversion of camera dependent values of orientation and distances into camera-invariant values are described in further detail below.

The aforementioned processing results in an array where if a pixel corresponds to a vehicle, whose absolute 3D property value is known, it is assigned the appropriate camera invariant value. If training is to be performed for estimating multiple types of 3D properties, multiple arrays may be generated. For example, if models for estimating orientation and distance are to be trained, then two arrays (one for orientations and one for distances) may be created.

In some embodiments, if the pixel in the image does not correspond to an object whose camera invariant values are known (or cannot be computed), a value is assigned that allows it to be ignored during training (e.g., so that during the training process, incorrect predictions for those pixels do not influence the updating of the model parameters). For example, a pixel belonging to a road surface would not be assigned a camera-invariant quantity, and would be ignored. In other embodiments, those pixels that are to not be considered when updating of the parameters of the model are assigned a value that causes them to be ignored during model updating (e.g., when computing a loss function to determine the accuracy of the model's predictions at a training step).

In some embodiments, the training samples including the camera invariant values and the images they correspond to are stored. For example, they are stored in a cloud storage such as Google Cloud Storage as numerical arrays. In some embodiments, the numerical arrays are of a same uniform shape.

In some embodiments, in order to sample from as many different possible values of a given 3D property (e.g., as many different orientations, distances, etc. as possible), the numerical array(s) of 3D properties are separated into distinct partitions based on what values of the 3D property (e.g., what orientations, distances, etc.) are present. For example, for distances, partitions are created for images that contain vehicles 0-10 meters away, 10-20 meters away, 20-30 meters away, etc. This allows the predictive model being trained to have an understanding of the world that is not biased by the distribution of the data that has been collected.

The following are embodiments of predictive models that are trained to estimate camera-invariant 3D property values. As one example of a predictive model, a candidate neural network architecture is defined to model the relationship between the arrays of camera-invariant 3D property labels (e.g., orientation, distance, etc.) and the RGB images they correspond to.

In some embodiments, with the training data uniformly defined and unbiased, and a candidate model in use, model updating engine 212 is configured to update the model to iteratively improve the candidate model's ability to predict the camera invariant 3D property arrays for the RGB images in the training samples. As one example, the model updating engine 212 is implemented using a package such as the Tensorflow software package. In some embodiments, model updating engine 212 is configured to iteratively improve the candidate predictive model's ability to predict the camera-invariant 3D property arrays by updating tunable values within the neural network. In some embodiments, the updating of the tunable values (e.g., weights) of the model are updated in order to minimize the errors (computed using loss function engine 214 in this example) between the neural network's predicted values and the actual labels that have been determined and collected in a balanced fashion, for example, using the partitioning described above.

The following are further embodiments regarding the loss function (e.g., loss function 214) used during training of the predictive model for predicting camera-invariant values.

The data that is collected for the training of such models as those described herein can be noisy. For example, the labels applied to pixels in a 2D RGB image can be noisy. As one example, the target labels are normalized versions or representations of actual 3D property values. For example, for distance prediction, the label for a pixel is determined by taking an actual 3D property value corresponding to the pixel and normalizing that value according to some unit of interest, such as a camera property. In some embodiments, the actual 3D property value is obtained from a sensor (e.g., LiDAR) different from the camera that captured the 2D RGB image, and alignment in both time and space is performed in order to determine the 3D property value that is appropriate to determine the camera-invariant quantity for a given pixel. Noise in the labels can be introduced due to the alignment process.

In some embodiments, the loss function is designed or configured to handle such noise. Examples of loss functions that can be used include L1 loss, Huber loss, as well as other regularization terms together with the loss functions. In some embodiments, L2 loss or least squares loss is employed. The loss function used may be fine-tuned to adjust the accuracy of the resulting predictive model.

In some embodiments, the model updating process is run until the predictive model or network no longer improves. One example way of determining whether the network shows signs of improving is to have a hold-out or test set of data that is hidden from (or otherwise unused in) the training process. Good performance on this hold-out dataset is indicative of the model having learned the appropriate relationship between an RGB image and the corresponding camera-invariant 3D property arrays. Poor performance is indicative of the candidate network either not having the capacity to perform better, or that the model is being trained on insufficient training data to learn the relationship between the objects in the images and their corresponding camera-invariant 3D property label values. In some embodiments, such outcomes can be distinguished by comparing the performance of the network on the hold-out/test set and the training dataset.

In some embodiments, if a lack of data is an issue, situations where the network predications are most errone-ous can be identified and targeted for further data collection, where the training process is repeated until the performance of the network no longer improves.

In some embodiments, if the predictive network has been trained on sufficient data, but is unable to satisfactorily learn the desired relationship (between the pixels of vehicle objects and their corresponding labels of camera-invariant values), a new candidate network is evaluated that includes more tunable values (e.g., numbers of layers or features), or are of different architectures (e.g., U-nets, transformers, convolutional neural networks (CNNs), etc.) where the training process is repeated until satisfactory performance is attained.

In some embodiments, once sufficient performance is achieved, the trained predictive model may also be used as a source of training data. As one example, the network's predicted 3D property values (e.g., orientation values, dis-tance values, etc.) of a vehicle across several frames (e.g., frames of a video, where each frame is an RGB image) are collected. Denoising of the predictions (e.g., smoothing) is then performed to remove predictions for which there is not sufficient confidence in accuracy. This results in a synthetic dataset whose accuracy is higher than the network it was derived from. This synthetic dataset can then be used to augment datasets derived from more resource-intensive sources such as human labelers.

In some embodiments, once a satisfactory neural network is determined and trained, the trained network is converted (e.g., using an SDK (software development kit) such as NVIDIA TensorRT) into a format which is optimized for prediction performance on graphical processing units (GPUs) (which may be installed in autonomous vehicles, for example). Model deployment engine 216 is then configured to deploy the optimized and trained model, such as to autonomous vehicles, examples of which are further described in detail below.

In some embodiments, different predictive models are generated for facilitating different types of predictions and/ or for different types of objects. For example, different models may be trained to make depth predictions for indi-vidual types of objects (e.g., only for vehicles, or only for bicycles, or only for pedestrians, or only for motorcycles). In other embodiments, a model is trained to make depth predictions for multiple types of objects concurrently. In some embodiments, different models are trained for predict-ing different types of properties (e.g., different models for predicting depth, orientation, etc.). In other embodiments, a single model with multiple different modules for making predictions for different types of properties is built/trained. The scope of the model may be adjusted based on the training data that is supplied. For example, training a model that jointly predicts properties for multiple types of objects (e.g., both vehicles and pedestrians) includes generating training samples with images that contain both vehicles and pedestrians, with appropriate camera-invariant values assigned as target labels for training. The models described herein may be trained for making camera-invariant predic-tions with respect to any object (or objects) of interest.

Figure 2B:
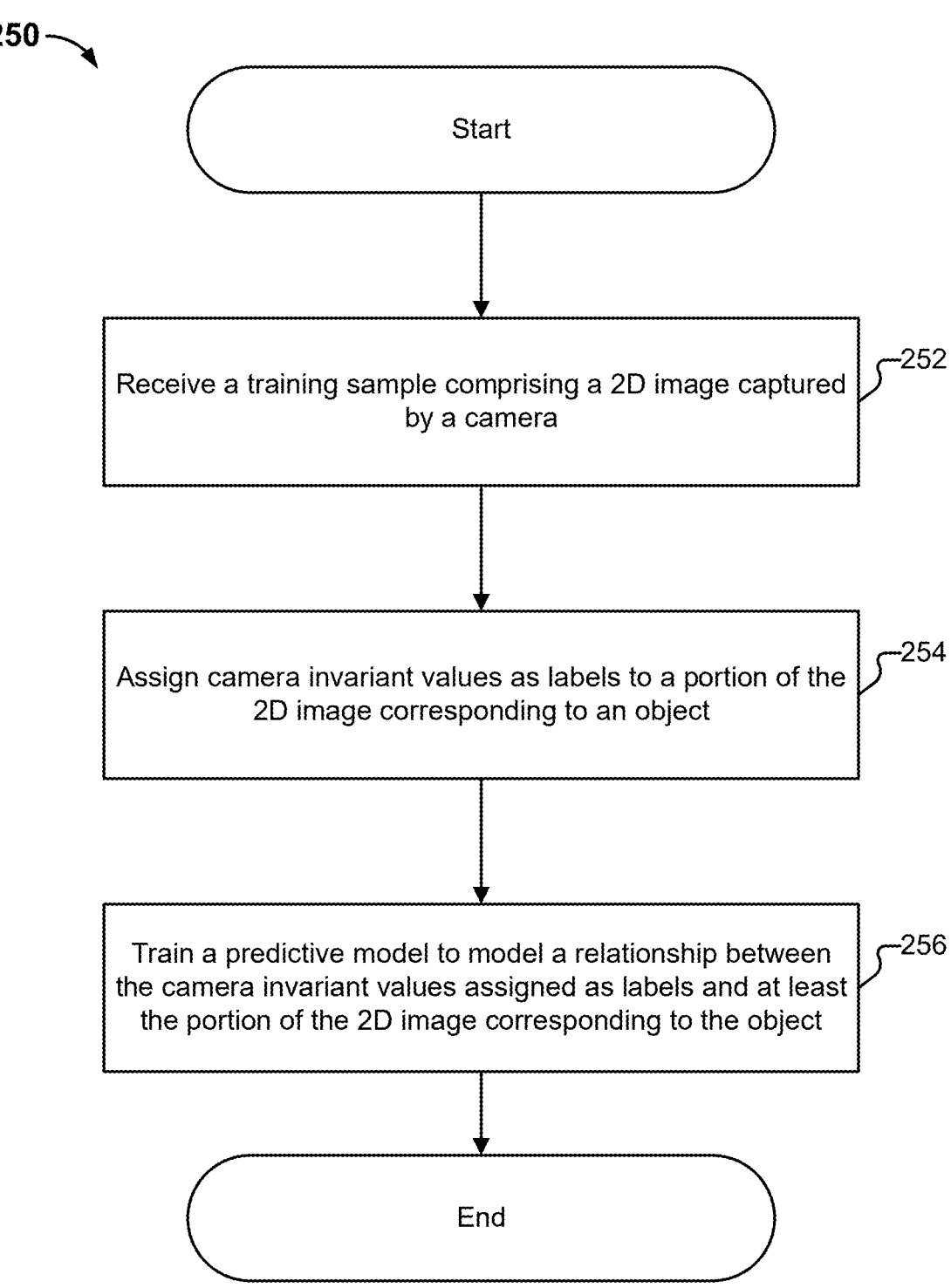
FIG. 2B is a flow diagram illustrating an embodiment of a process for training a predictive model for estimating camera-invariant 3D properties.

FIG. 2B is a flow diagram illustrating an embodiment of a process for training a predictive model for estimating camera-invariant 3D properties. In some embodiments, pro-cess 250 is executed by model training and deployment system 200 of FIG. 2A. The process begins at 252, when a training sample including a 2D image captured by a camera is received. At 254, camera invariant values are assigned as labels to a portion of the 2D image corresponding to an object. At 256, a predictive model is trained to model a relationship between the camera invariant values assigned as labels and at least the portion of the 2D image corresponding to the object.

As one example, a camera-invariant version of a 3D property is a normalized version of the 3D property that is normalized to a unit of interest. For example, to generate a camera-invariant version of the 3D property, depth, a nor-malized version is generated by dividing the depth (e.g., in meters, feet, etc.) by a unit such as pixel focal length. Another example is height of an object per pixel. The dividing is an example of an invertible transformation. At inference time, when a camera parameter can be accessed, the absolute value of depth can be recovered by multiplying the normalized depth prediction by the accessed camera parameter (e.g., pixel focal length). Further details regarding absolute 3D depth estimation by predicting a normalized depth representation are described below.

As another example, for the 3D property of absolute orientation, an example related camera-invariant quantity (from which absolute orientation can be recovered) is a relative orientation quantity. As will be described in further detail below, in some embodiments, the relative orientation quantity that is predicted is a relative angle between an object's heading and a viewing direction (from the imaging system). At inference time, the absolute orientation of a target vehicle relative to the ego vehicle (e.g., angle between heading of target vehicle and heading of ego vehicle) is recovered by accessing a camera parameter (e.g., focal length and field of view) to determine the viewing direction (e.g., angle of imaging ray). For example, the angle of the viewing direction is combined with the predicted relative orientation value to determine an absolute orientation value. Further details regarding absolute orientation estimation by predicting a camera-invariant relative orientation represen-tation are described below.

Figure 3A:
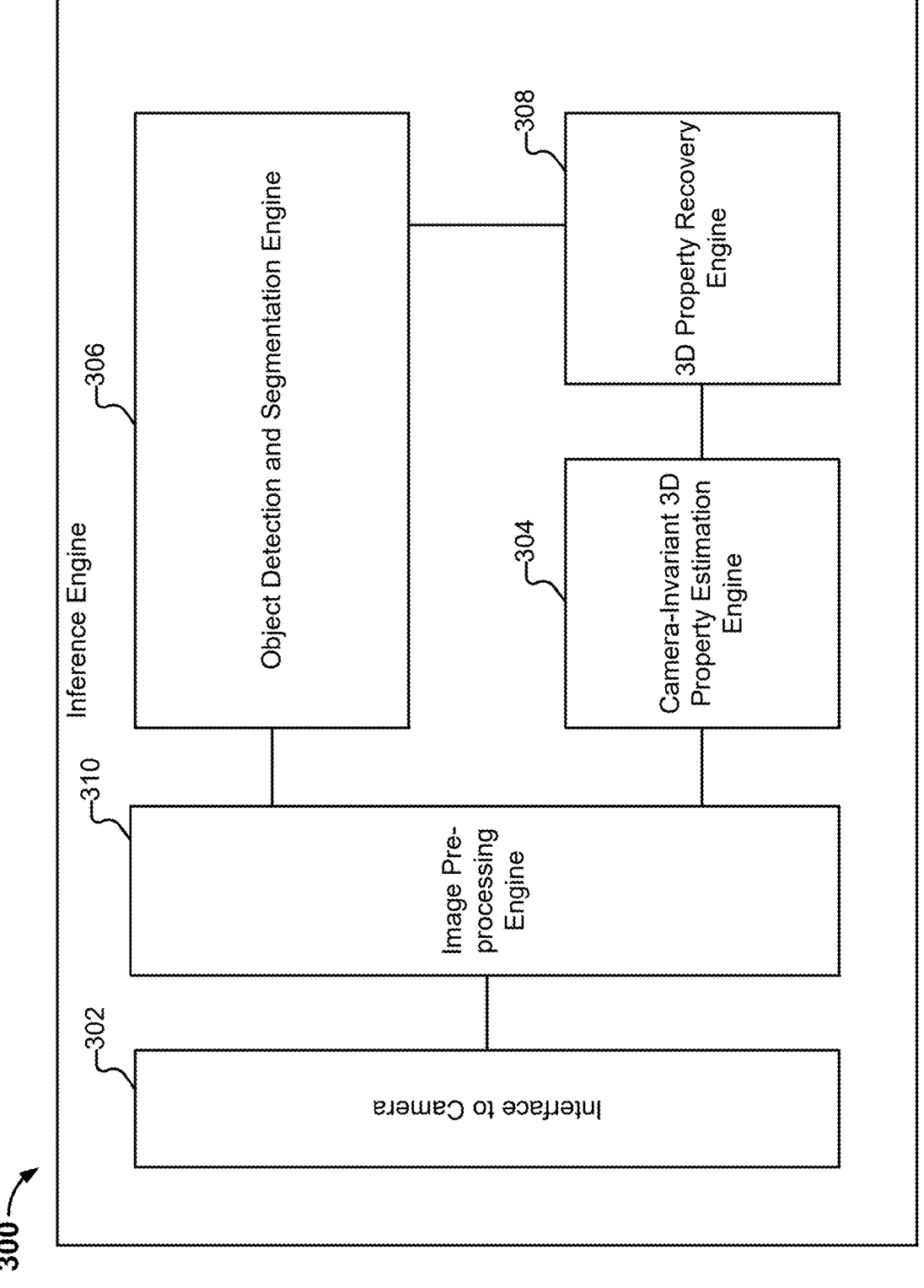
FIG. 3A illustrates an embodiment of a system for estimating 3D properties of objects using predictive models for predicting camera-invariant 3D properties.

FIG. 3A illustrates an embodiment of a system for esti-mating 3D properties of objects using predictive models for predicting camera-invariant 3D properties. In this example, estimating of 3D properties of objects involves an (interme-diate) step of predicting a camera-invariant quantity asso-ciated with the 3D property of an object. Properties or parameters of the camera are then applied to the predicted camera-invariant 3D property to resolve or recover an estimate of the absolute 3D property of the object.

In this example, the inference engine is a computing engine located at an ego vehicle. For example, inference engine 300 is an example of inference engines 114 and 120 of vehicles 110 and 116, respectively. The ego vehicle includes an imaging system to capture images of vehicle's surroundings (e.g., imaging system such as camera systems 112 and 118). 3D properties of detected objects are deter-mined by the inference engine relative to the ego vehicle.

In this example, a captured image of a portion of an environment of an ego vehicle is received via camera interface 302. The image is passed to image pre-processing engine 310. Image pre-processing engine 310 is configured to perform pre-processing of the image from the camera sensor. Examples of pre-processing include rectification, distortion correction, etc. Further details regarding pre-processing are described below.

The (pre-processed) image is passed as input to camera-invariant 3D property estimation engine 304. As one example, estimation engine 304 predicts camera-invariant values using a deployed predictive model, such as a predictive model trained by model training and deployment system 200 of FIG. 2A. For example, the estimation engine 304 predicts, for each pixel in the image, a predicted camera-invariant quantity.

Object detection and segmentation engine 306 is configured to identify unique objects within the image that was provided to the estimation model 304. For example, segmentation engine 306 is a model that is configured to identify unique objects in the same image that was provided as input to estimation engine 304, and for each unique object, what pixels (indicated, for example by their indices) in the image correspond to a given identified unique object. For example, in the context of autonomous driving, the segmentation engine 306 can be configured to identify objects such as vehicles, pedestrians, cyclists, traffic cones, buildings, etc. Segmentation engine 306 and estimation engine 304 may be implemented as separate models, or as different modules of the same model. For example, a single model may be implemented that has both segmentation and camera-invariant property prediction capabilities.

The segmentation processing may be performed prior to, in parallel with, or subsequent to the camera-invariant 3D property prediction. In some embodiments, the segmentation is performed first on the (pre-processed image) to identify unique objects in the image. The estimation model 304 is then run to only make predictions for those pixels corresponding to the unique objects identified by the segmentation model. In this way, predictions need not be made for every single pixel in the original image (only those subsets of pixels corresponding to unique objects identified by the segmentation model). In other embodiments, the segmentation is performed in parallel or subsequent to the camera-invariant 3D property estimation, where the same (pre-processed) image is fed to both segmentation engine 306 and property estimation engine 304. This allows the camera-invariant 3D property estimation engine to utilize the receptive field of each pixel when making per-pixel predictions (e.g., where the predictions made for a local patch of pixels can be dependent on the full image, or a non-trivially large local neighborhood for the pixel of patch of pixels).

3D property recovery engine 308 is configured to determine a 3D property of an object identified in the image. For example, the estimation engine 304 predicts a camera-invariant value for each and every pixel in the image. The segmentation engine 306 identifies unique objects and which collection of pixels maps to each unique object. The outputs of the segmentation engine 306 and the estimation engine 304 are combined to obtain the collection of predicted camera-invariant values for those pixels identified as corresponding to a unique object. In some embodiments, the 3D property recovery engine is configured to determine a single absolute 3D property value from the collection of per-pixel camera-invariant predictions determined for an object. In some embodiments, the 3D property recovery engine is configured to determine, for each per-pixel camera-invariant prediction, an estimated absolute 3D property value based on that pixel's camera-invariant predicted quantity and an accessed parameter of the imaging system that captured the image. The per-pixel absolute estimates are then aggregated to determine a single absolute 3D property value for the object. In other embodiments, the camera-invariant values are aggregated to determine a single aggregate camera-invariant value for the object. The single aggregate camera-invariant value is then combined with an accessed set of camera properties to determine an estimated absolute 3D property value for the object. Examples of aggregations include robust aggregation techniques such as outlier removal. In some embodiments, the recovery processing described herein is performed for each unique object in the image identified by the segmentation model.

As described above, and as will be described in further detail below, after an input image is provided to the model, the model produces its per-pixel predictions. As described above, in connection with the camera-invariant object property prediction, a segmentation model is used to identify, in the input image, what pixels correspond to what objects. The following are further examples of utilizing the segmentation model in conjunction with the camera-invariant predictions at inference time.

For example, suppose that there is a single vehicle in front of the camera of the ego vehicle that the camera is able to capture. The segmentation model may be used prior to, concurrently with, or subsequently to the camera-invariant property prediction model. The segmentation model is configured to identify which pixels in the input image correspond to the vehicle. If there are multiple vehicles, each vehicle's pixels are identified as different object instances of interest. For each collection of pixels corresponding to a unique object/vehicle instance, an efficient aggregation is performed on the per-pixel camera-invariant predictions made for that collection of pixels to produce a single value (e.g., real number) that is a camera-invariant quantity associated with a 3D property of the object. Using the processing described herein, a camera-invariant quantity that, for example, is a normalized representation of a 3D property is generated for each instance of interest detected by the segmentation model. At the inference engine, available camera intrinsic parameters (which are accessible and available at the vehicle, although not necessarily at the backend where the model was trained and deployed from) are used to produce the absolute value of the 3D property (e.g., via 3D property recovery engine 308).

In the above example, the parameters of the camera usable to recover the absolute 3D property value are accessible by the inference engine that is performing the predictions at the ego vehicle to which the camera is mounted.

The following are examples of determining absolute values of 3D properties if camera intrinsic parameters are unavailable. For example, suppose a 5-minute video has been captured, with the image frames of the video to be processed by the predictive model. Suppose that captured in the video are multiple objects-sedans, SUVs, buses, trucks, etc. Using the segmentation and camera-invariant predictive models described herein, camera-invariant quantities associated with a 3D property of interest are generated for each of the vehicle objects. In some embodiments, the relative camera-invariant 3D property representations are used to predict or estimate an underlying parameter of the camera (e.g., estimate for the value of the parameter of the camera that a normalized 3D property representation is normalized to). The estimated camera property is then used to recover the absolute 3D property values for the objects identified by the segmentation model.

In the example of FIG. 3A, the inference engine includes an image pre-processing engine (310). The pre-processing engine is configured to pre-process the images received from the camera sensor, where the processed images are then provided as input to estimation engine 304 (as well as segmentation engine 306). The following are examples of pre-processing.

One example of pre-processing is performing of rectification of the raw image received from the image sensor (e.g., via camera interface 302) and sending of a rectified version of the image to the estimation engine 304 (and segmentation engine 306). One example of rectification is to change the size of the image to match the input resolution expected by the estimation engine. For example, the camera may be capturing larger images of, for example, 1000×1000 pixels. The model may be working or operating at a fixed resolution, such as 200×200 pixels. In some embodiments, the image received from the camera (via camera interface 302) is rectified to resize the image prior to being provided to the predictive model.

The following are further examples of rectifications. Another example of a rectification that is performed is to remove distortions introduced by the camera. The distortion correction performed can be based on parameters of the camera system that are accessed by the vehicle in which the inference engine is located. An example of a distortion that can be corrected or rectified is distortion introduced by fisheye lenses. After the distortions are corrected, the corrected image can then be resized as described above to the input size of the model, where the re-sized and distortion-corrected image is provided as input to the model. For example, the rectified image is converted into a format (e.g., RGB image format) that is consumable by the model being executed.

Examples of model implementations include neural networks. In some embodiments, the models are run or executed on hardware such as graphical processing units (GPUs) installed in the vehicle (e.g., where the segmentation and camera-invariant prediction models are implemented on a GPU). For example, in the context of autonomous driving applications, the GPUs are used to quickly and efficiently process the rectified input image in order and generate a prediction. Embodiments of the models described herein may also be implemented on other types of hardware, such as central processing units (CPUs), FPGAs (Field Programmable Gate Arrays), etc.

In some embodiments, the inference is performed in near real-time (e.g., on the order of 15 times per second) in order to capture, using the predictive models described herein, the changes in the environment that are being observed or sensed by the camera system.

Figure 3B:
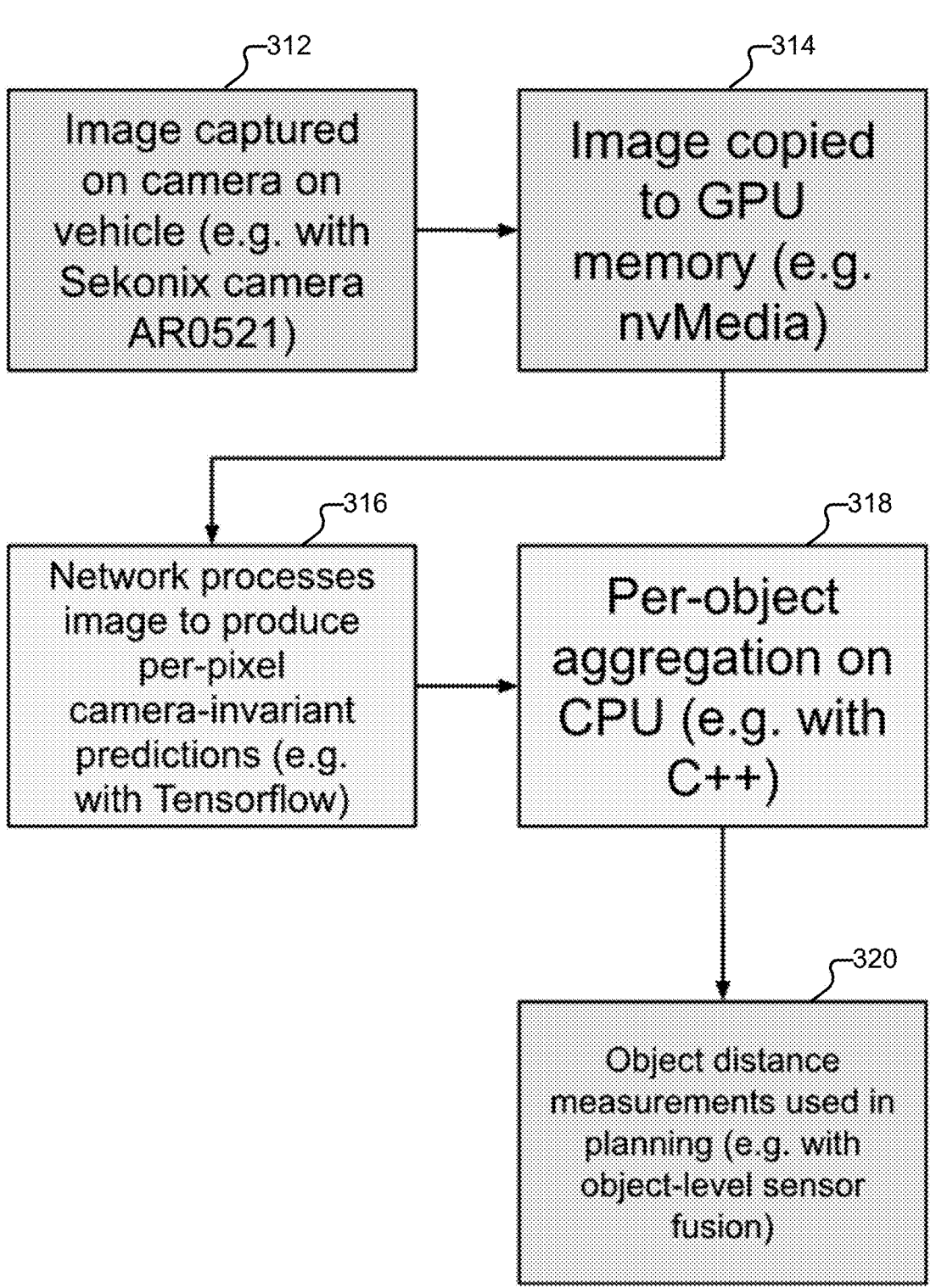
FIG. 3B illustrates an embodiment of a system for 3D property estimation.
Figure 3B:
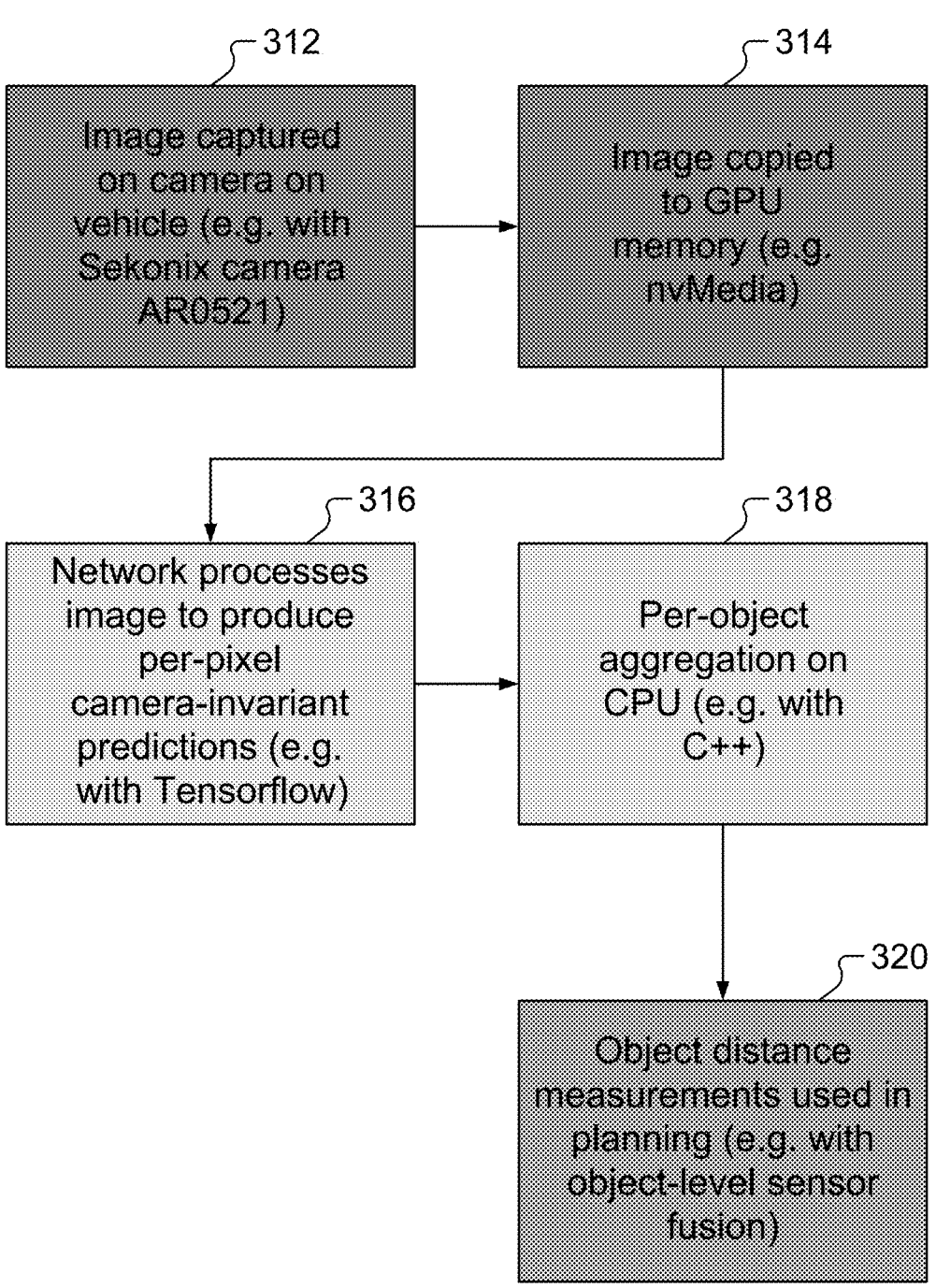

FIG. 3B illustrates an embodiment of a system for 3D property estimation. In this example, a system for estimating 3D properties of vehicles in real-time in a driving context is shown. As one example, the system shown in FIG. 3B is an alternative view of inference engine 300 of FIG. 3A. In this example, images are acquired at 312 and 314 (e.g., 2D RGB images captured by a camera system). For example, at 312, an image is captured using a camera on an ego vehicle. At 314, the image is copied to memory of a GPU (graphics processing unit), such as nvMedia as one example. At 316 and 318, the system is configured to produce predictions (e.g., neural net predictions) and use them to estimate per-object 3D properties. For example, at 316, a model or network processes the image to produce per-pixel camera-invariant predictions (e.g., using TensorFlow). At 318, per-object aggregation is performed (e.g., on a central processing unit (CPU) using a computing language such as C++). At 320, 3D properties are used in sensor function and planning algorithms. For example, the absolute 3D properties (e.g., absolute object distance and/or absolute orientation) are used in planning (e.g., with object-level sensor fusion).

Figure 3C:
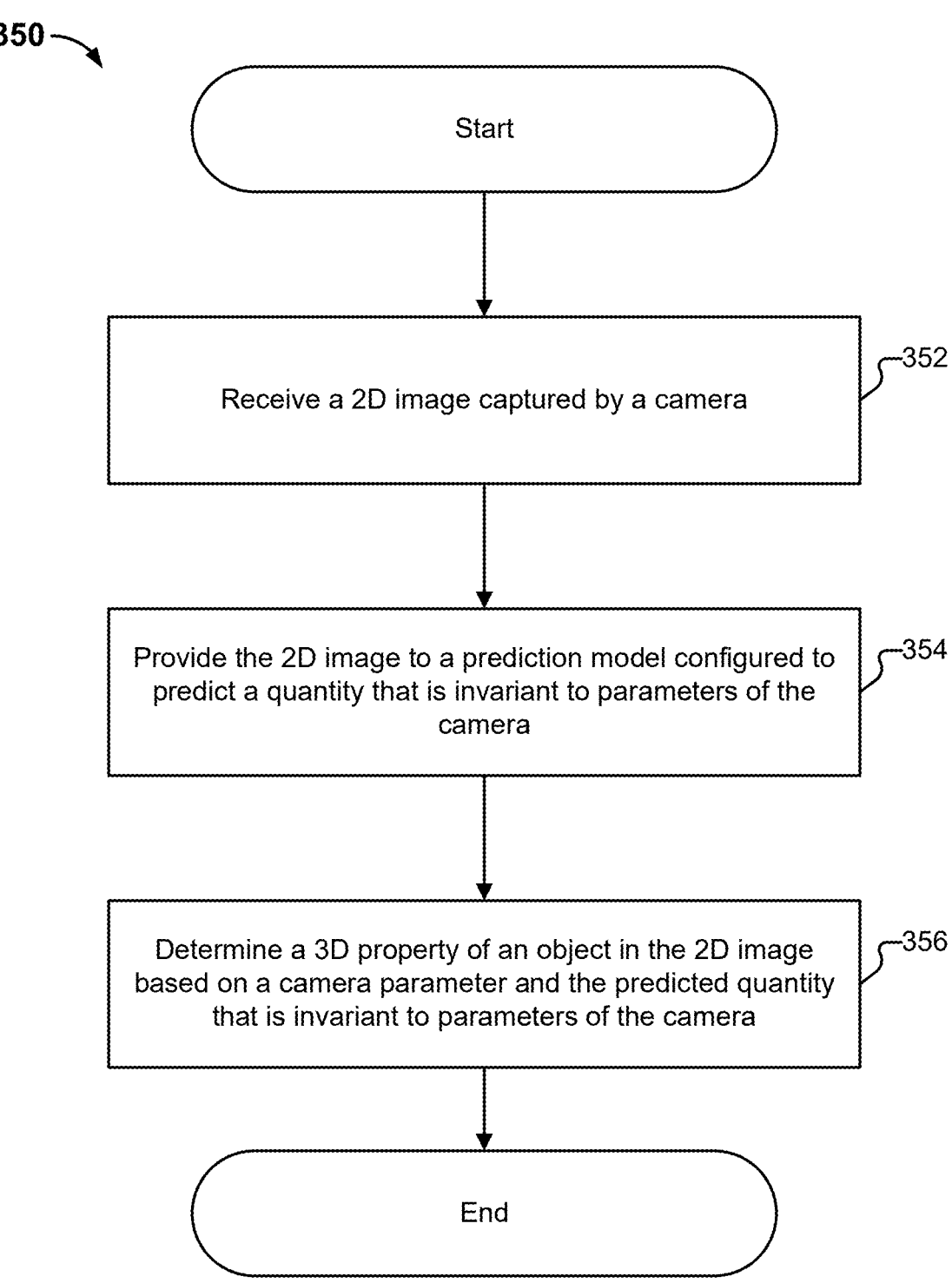
FIG. 3C is a flow diagram illustrating an embodiment of a process for estimating a 3D property of an object using a predictive model for estimating camera-invariant 3D properties.

FIG. 3C is a flow diagram illustrating an embodiment of a process for estimating a 3D property of an object using a predictive model for estimating camera-invariant 3D properties. In some embodiments, process 350 is executed by inference engine 300 of FIG. 3A. The process begins at 352, when a 2D image captured by a camera is received. At 354, the 2D image is provided to a prediction model. Based on the 2D image, the prediction model predicts a quantity that is invariant to parameters of the camera. Examples of camera invariant 3D properties include camera invariant depth predictions and camera invariant orientation predictions. At 356, a 3D property of an object in the 2D image is determined based on a camera parameter and the predicted quantity that is invariant to parameters of the camera.

The following are further embodiments of techniques for camera-invariant 3D property formulation. As described above, examples of 3D properties that can be estimated using the techniques described herein include:

distance estimation 3D bounding box orientation estimation

Further details regarding estimation of such 3D properties of an object from its appearance in a 2D image captured by an imaging sensor of an ego vehicle are described below. Also described are further embodiments of determining camera-invariant versions of such 3D properties (and that can be used at inference time to recover absolute 3D property values), including determining invertible transformation functions between a 3D property and its camera-invariant version. Camera-invariant depth prediction and orientation prediction are two different examples of physical quantities being targeted using the camera-invariant predictions described herein. The invertible transformation functions (e.g., used to generate camera-invariant values that can be used to recover absolute physical quantities) that facilitate such predictions that are invariant to camera parameters are also different, and will be described in further detail below.

While embodiments of distance estimation and 3D bounding box orientation estimation are described herein for illustrative purposes, the camera-invariant 3D property estimation techniques described herein may be variously adapted to estimate any other type of 3D property of an object, as appropriate.

Distance/Depth Estimation

The following are further embodiments of distance estimation and depth prediction. In the following examples, embodiments of structured depth prediction are described. For example, predictions of camera-invariant depth are made, which are then combined with camera parameters to obtain an estimated absolute depth value for an object sensed by the imaging system of an ego vehicle.

Figure 4A:
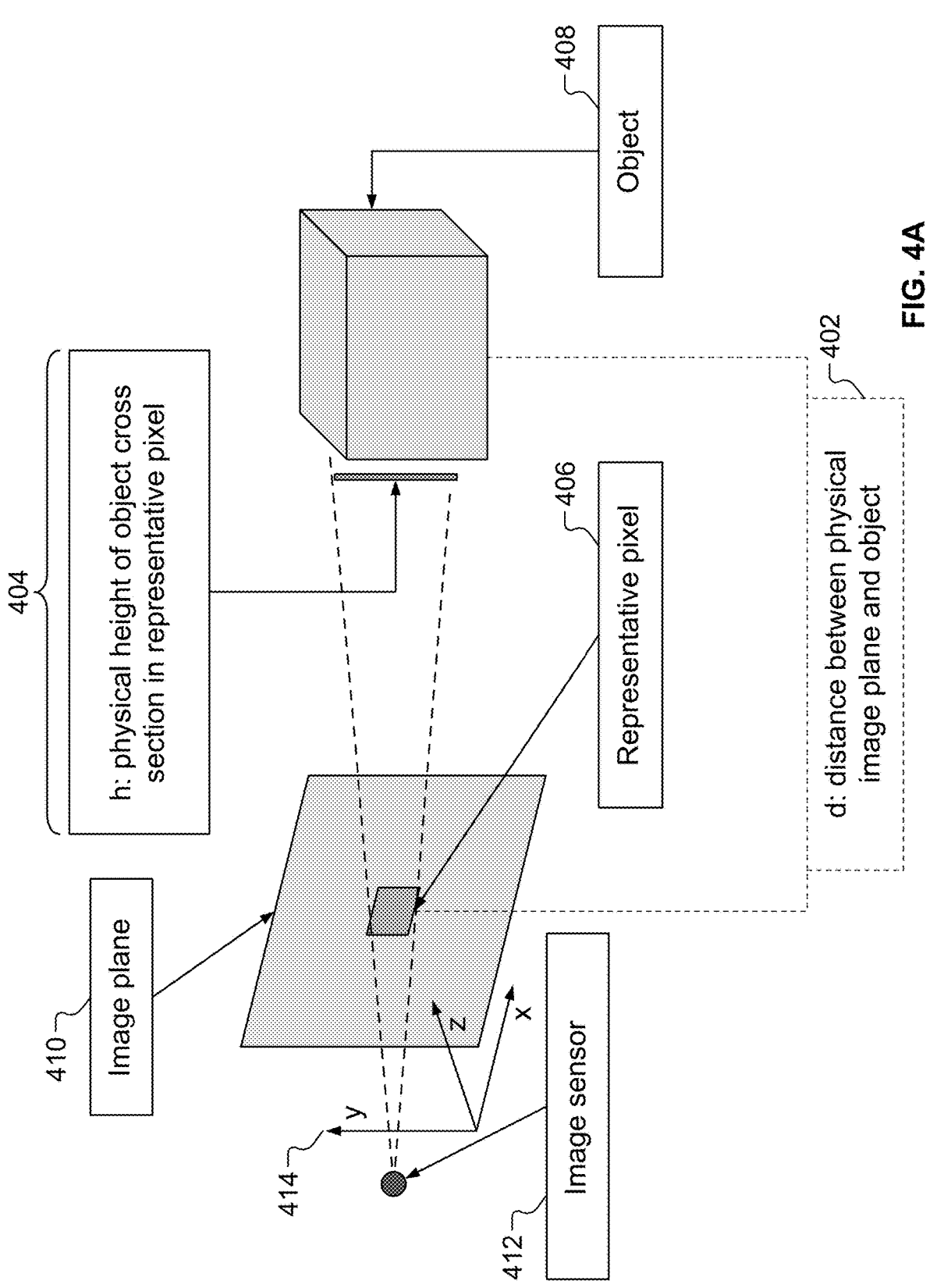
FIG. 4A illustrates an embodiment of distance estimation.

FIG. 4A illustrates an embodiment of distance estimation. In one embodiment of distance estimation, distance estimation is recast as shown in the example of FIG. 4A. In some embodiments, for each pixel, rather than directly predicting the physical distance d (402) to the object (408), which may be ill-posed for a predictive model, as described above, the height h (404) of the cross-section of the object that is visible within that pixel (representative pixel 406, captured by image sensor 412) is predicted.

For example, suppose a car that is 2 meters tall that spans 5 pixels in the image plane 410. In this example, the target value is (2 meters)/(5 pixels)=0.4 meters/pixel. This quantity is invariant to the parameters of the camera. Given the focal length of the camera, the actual (absolute) physical distance to the object can be recovered. As shown in this example, rather than being trained to directly predict a depth of a pixel (relative to the camera), the model is taught or trained to predict the ratio of the height of the vehicle and the number of pixels that the height corresponds to in the image. At inference time, this ratio of height/pixel is then combined with a value for the camera parameter of interest (e.g., pixel focal length) to determine the absolute depth.

While examples of distance estimation with respect to objects in the context of autonomous driving are described for illustrative purposes, embodiments of the distance estimation techniques described herein may be variously adapted to accommodate distance estimation for any type of object, as appropriate.

In the example of FIG. 4A, suppose that the camera input is a 2D RGB image without attached 3D context (e.g., without 3D channel information, LiDAR data, etc.). A portion of the image includes an object such as a vehicle. In this example, the task is to predict how far away (e.g., depth) the object is from the plane of the camera that took the image.

In the examples described herein, the camera is modeled based on a rectilinear or pinhole camera, which operates based on projections of rays on the image plane. Other camera models may also be supported (e.g., after performing a camera model's associated rectification procedure). Predicting the depth of an object (distance of object from camera image plane) facilitates various other types of determinations. For example, once the depth of a pixel (e.g., a pixel that corresponds to some portion of the object) in the image is predicted, other relevant 3D quantities for that pixel or object of interest can be determined. For example, once the depth dimension of the object is determined, this information can be used to determine the location of that pixel or object in 3D space.

For example, referring to the example of FIG. 4A, ultimately, the goal is to predict the orthogonal distance of the object 408 from the image plane 410. That is, the image includes a projection of the object onto the image plane. The task is to predict the depth of the object within the image captured by image sensor 412.

Suppose a coordinate system 414. The coordinate system includes 3 axes, a y-component pointing upwards from the camera focal point, an x-axis, and a z-axis (also referred to in this example as a depth axis) that is perpendicular to the image plane. The absolute value of the object with respect to the z-axis is to be predicted. Once the absolute depth/distance is predicted, by evaluating the X and Y values on the image itself for any pixel, and using the determined depth value, the 3D X and Y values can also be produced, with the object thereby located in 3D space.

The following are further examples and details regarding depth estimation. In the case of a 2D RGB image, the object is projected onto the image, and any depth information or sense of scale is lost. For example, suppose two cameras, a camera of a mobile device and a digital SLR (single-lens reflex) camera. The two cameras capture images in different ways due to having different camera parameters, such as different fields of view.

As another example, suppose the same SLR camera body, but two different lenses, one wider than the other. In this example, the two lenses would result in different fields of view (FOVs) being captured. For example, suppose that using the first lens, a 60-degree fOV is obtained. Using the second, wider lens, a 120-degree fOV can be imaged. Now suppose that the size of the image being captured by the camera is fixed, such as a 200 by 100 pixel-sized image, regardless of which lens is used. Now suppose that the same object is being imaged twice by the same camera, once with the first lens, and again with the second, wider lens, with the object kept in the same position relative to the camera (and the same distance away from the camera). As the field of view increases, the area and size (e.g., number of pixels) that the object occupies in the 200-by-100 pixel image decreases. For example, when using the lens with the wider field of view, the same 200-by-100 pixels are being used to capture or sample a larger field of view as compared to the lens with a narrower field of view, and the object will occupy a smaller number of pixels in the image captured by the wider lens as compared to the narrower lens.

In this example, as the field of view increases, this will have the effect of simulating an object that is farther away from the camera. That is, even though the same object was located in 3D space in the same location relative to the camera (e.g., same absolute distance away from the imaging system), because of the different camera parameters (different FOVs due to two different lenses being used), the object will appear to be further in one image than the other image. In this case, this could lead to a model or a human (who does not have information about the properties of the camera that took the images) falsely identifying that the object in one of the images is farther away from the camera than it actually is.

As described above, it would be beneficial to train a model that is deployable to vehicles with disparate types of camera systems (and different camera parameters), to avoid having to generate and train individual models specific to a single camera setup, and that must be deployed to specific vehicles with the appropriate corresponding camera setup.

As described above, in some embodiments, to train and build such a universally deployable model, the model is designed to predict a camera-invariant property. In the above example, rather than training two separate models, one for predicting depth of objects in images captured by the camera SLR body with the first lens with the first FOV, and another model for predicting depth of objects in images captured by the camera SLR body with the second lens with the second FOV, a single model is trained. In this case, the model is trained to predict a camera-invariant property, where the same type of camera-invariant quantity will be generated for the object in the two images captured with different FOVs. For example, suppose that the car is 2 meters tall. In the first image captured by the first lens, the car is 8 pixels tall. In the second image captured by the second, wider lens, the car is 4 pixels tall. For the first image, for the pixels corresponding to the vehicle, the model will predict a height per pixel of (2 meters)/(8 pixels)=0.25 meters/pixel. For the second image, for the pixels corresponding to the vehicle, the model will predict a height per pixel of (2 meters)/(4 pixels)=0.5 meters/pixel. For a pinhole model, this value is equivalent to depth (of the object) divided by the pixel focal length After the FOV (camera parameter) is applied (which is different for the two images because the camera FOVs were different), the same absolute depth value will be determined in both cases.

As one example, in this case, the model is trained to predict, for a portion (e.g., pixel) of an image, a distance that is in the units of field of view—that is, a value that is normalized to the field of view that was used in capturing the image. The prediction of such a type of camera-invariant value removes the ambiguity in 3D property estimation due to unknown properties of the camera that captured the image. For example, the ability of the model to make such a structured prediction given an input image is not reliant on having (prior) knowledge of the parameters of the camera that captured the image. For example, the models described herein do not require or need the parameters of the camera that took the image in order to generate its predictions. As described herein, the prediction models described herein learn to make their predictions (which are camera-invariant values) by removing this dependency on camera parameters.

As described above, in the example of FIG. 4A, when the image is captured by the image sensor, a portion of the object within the field of view of the image sensor is projected onto the image (plane). The projection of the object onto the image plane will occupy a corresponding set of pixels. For example, the image will have a subset of pixels that is representative of the projection of the object onto the image plane. The predictive model is configured to predict, for each representative pixel, a camera-invariant value, which in this example is the height of the cross-section of the object that is visible within a given pixel.

For example, the image contains a subset of pixels (in an image) that corresponds to the view of a portion of the object captured by the image sensor. The predictive model is trained to learn, based on training on images with vehicles at various depths, angles, etc., the height of the vehicle per pixel given its appearance in the image.

For example, suppose that a camera has captured the image of a vehicle in front of the camera. As one example, in order to facilitate the ultimate determination of the distance of the vehicle from the camera, a predictive model is used to predict a height/pixel of the pixels corresponding to the vehicle (object) in the image. For example, if the vehicle is two meters in height and occupies 200 pixels of height in the 2D image, then the model is trained to predict a camera-invariant value of $2/200=0.01$ meters/pixel. For a pinhole model, this value is equivalent to depth (of the object) divided by the pixel focal length, and is indicative of the depth represented in the units of the field of view. Thus, when using such a camera-invariant prediction model, even if an image that includes the vehicle is captured with a camera with a very large field of view, such that the vehicle appears small, because the prediction made for the pixels corresponding to the vehicle is presented with respect to the units of the field of view, the "smallness" of the appearance of the object in the image (e.g., the proportion of the pixels occupied by the object compared to the total number of pixels of the image) does not adversely affect the prediction, as the predicted values correspond to predicting the object's physical height divided by the number of pixels. After the camera-invariant version of depth is predicted for the object, if the number of pixels or field of view of the camera is obtained, the absolute depth of that object relative to the camera can be recovered or otherwise determined from the predicted camera-invariant value.

Based on the above, the following are two manners in which to consider the invariance. One is by predicting values that are in the units of field of view, and another is by predicting a quantity that corresponds to the physical height of the object divided by its physical height. As the pixel height can be determined from the image itself, the physical height of this object can be recovered. When the camera parameters (e.g., field of view) are obtained (e.g., via software running at the ego vehicle where inference is being performed), the absolute value of the depth of the target object can be calculated.

The following are further embodiments of training a predictive model to predict camera-invariant values pertaining to object depth. In this example, the model is being trained to learn the normalized depth (camera-invariant value) of a vehicle based on the pixels corresponding to the vehicle in an image. The following are examples of generating a training sample. In this example, a training image (e.g., 2D RGB image) is received. The training image includes one or more unique vehicles. For each pixel that corresponds to a unique vehicle in the image, the same numerical value, corresponding to normalized depth, is assigned as a ground truth or target label to the pixel. In the case of generating a training sample, the depth of the vehicle is known (e.g., from other corresponding sensor information, such as LiDAR or radar), as well as the camera parameters, and the normalized depth can thus be computed according to an invertible transform.

In some embodiments, for depth, the minimum depth that would be measured relative to the vehicle (e.g., closest 3D point of vehicle relative to ego vehicle/camera) is utilized. The normalized minimum depth value is an example of a relevant quantity for autonomous driving (as it will be used, for example, to determine whether the ego vehicle, on its current path, will intersect with the object, and whether the ego vehicle should brake, for example). For example, while a vehicle is captured in an image, the portion of the vehicle that is captured in the image depends on, for example, the orientation and location of the vehicle relative to the camera system when the image was taken. For example, training images may include vehicles captured from behind, from the side, from the front (e.g., if the vehicle is captured while moving in the opposite direction), from a three-quarters view, etc. Suppose an image with a rear three-quarter view of a passenger-side of a vehicle. The vehicle will be captured in some portion or subset of the overall number of pixels of the image. In this example, some pixels correspond to the rear of the car, some to the side of the car, and some to a front corner of the car. In this example, the normalized depth values assigned to the pixels of this rear three-quarter rear view of the vehicle in the training image are based on the known minimum depth of the vehicle in the training image, such as from the corner of the rear bumper of the vehicle closest to the camera (closest point on vehicle to camera). The model is then trained to learn (based on the RGB values of the pixels in the image and the assigned labels) the normalized depth assigned to the vehicle according to the known minimum depth.

While in the above example, a normalized depth value corresponding to the minimum depth of the object (e.g., minimum depth divided by pixel focal length) is determined, normalized depth values to be assigned can be determined in other ways. For example, different normalized depth values for different pixels belonging to the unique object instance can be labeled.

The applying of a same normalized depth value (based on the minimum depth) to the pixels corresponding to a unique vehicle captured in a training image provides various benefits with respect to prediction at inference time.

For example, at inference time, suppose that a 2D image is captured in real time. Suppose that there are 500 pixels in an image corresponding to a unique vehicle (where the pixels corresponding to the vehicle may be determined according to a segmentation model operating on the received image at inference time).

The prediction model is configured to determine, for each pixel in the image (including the 500 pixels corresponding to the unique vehicle), a normalized depth value, where the normalized depth values may vary at inference time, even for the pixels that correspond to the unique vehicle.

Among the 500 pixels, the confidence of the predicted values for different pixels may vary. For example, suppose that for 100 of the 500 pixels, the predictions of the model have a lower accuracy confidence. The normalized depth values for the remaining 400 pixels are made with a higher accuracy confidence. In some embodiments, an aggregation, such as a robust averaging, of the predicted normalized depth values of all of the pixels of the unique vehicle for which predictions are being made is determined, where a single, aggregate, normalized depth value for the unique vehicle is returned with increased accuracy. In this example, the model has been trained to learn the relationship between all the pixels that a vehicle occupies in an image and normalized depth.

Such determination of an aggregate normalized depth value for the identified unique vehicle is in contrast to, for example, predicting a center of the identified vehicle, and limiting normalized depth prediction to the set of pixels corresponding to the center of the identified vehicle. If such an inference-time prediction were to be made, then the corresponding training would involve attempting to train the predictive model to predict a depth-related value for a small number of pixels corresponding to a center of a known vehicle. This may be too limited of information for the model, resulting in the model being unable to accurately learn the relationship between the pixel information and the assigned depth-related values.

In embodiments of the camera-invariant structured prediction techniques described herein, at training time, the predictive model is trained to predict normalized depth quantities for all pixels corresponding to unique instances of vehicles in training images, where the same normalized depth value is assigned for all of the pixels belonging to a unique vehicle instance. At inference time, the model makes a prediction for all of the pixels in an image. A segmentation model is used to determine the subset of pixels in the image that correspond to a unique vehicle. The predicted normalized depth values in the subset of predicted normalized depth values corresponding to the subset of pixels identified by the segmentation model as corresponding to the unique vehicle are aggregated to determine a single normalized depth value for the vehicle identified in the 2D image. For example, a robust average is taken for the camera-invariant depth quantities predicted for all of the pixels that are determined to correspond to a unique vehicle, resulting in a stable and accurate normalized depth value for the vehicle. A single absolute depth value for the target vehicle is then recovered by applying parameters of the imaging system to the aggregate normalized depth value.

While embodiments involving an object such as a vehicle are described herein for illustrative purposes, the structured prediction techniques described herein may be variously adapted to accommodate any other type of rigid or non-rigid or semi-rigid object, such as pedestrians, cyclists, buildings, etc.

Using the techniques described herein, a predictive model is trained such that, given two images that both have visually-similar local patches (e.g., portions or groups of pixels in the two images are similar in the RGB-space, but may occupy different area sizes or numbers of pixels in the two images, or be located in different regions of the two images), the model produces similar values for those visually similar local patches. In order to facilitate such a prediction, the models described herein are trained to predict a normalized quantity, which should be the same for the two local patches of the two different images.

For example, given a training image containing a collection of pixels corresponding to a view of a vehicle, and a target normalized depth value that is assigned as labels to the pixels that the vehicle occupies in the image, the model is trained to learn that when seeing such a similar view of a similar vehicle (e.g., similar arrangement of pixels with similar RGB values) in an image, what normalized depth value to predict for the pixels occupied by the vehicle (without the model necessarily knowing what pixels belong to a vehicle or not).

For example, suppose again two camera systems, one with a field of view of 60 degrees, and the second camera system with a field of view of 120 degrees. Suppose that the first camera system captures an image that includes a red vehicle. Suppose that the second camera system captures an image also of a vehicle that is the same make, model, and year, and that is also red, where the vehicle visible in the image captured by the second camera system is also captured from the same perspective as with the first camera system (e.g., the same parts or views of the vehicle have been captured in the two images). Suppose that in the image captured by the 60-degree fOV camera, the vehicle was 200 meters away from the camera system in 3D space. Suppose that in the image captured by the 120-degree fOV camera, the vehicle was 100 meters away. Suppose that the two camera systems generate 2D RGB images of the same pixel dimensions (e.g., 2000 pixels by 1000 pixels overall). In this example, the two resulting images would show the vehicles being similarly sized (e.g., occupying a similar number of pixels in both images). In this example, while the same depth/pixel focal length value is predicted in both cases, with the different pixel focal lengths applied, the absolute estimated depths will be determined.

The predictive models described herein are trained such that when similar objects are locally present, similar predictions are made. In the examples described herein, the structured prediction techniques include simplifying the task performed by the model so that the model can make more efficient and accurate predictions. For example, by being designed and trained to predict a normalized representation, the model is trained to produce similar predictions for local patches of images that are visually similar, without the model having to also learn complicated features such as internally estimating a field of view or other parameters of the camera that took the image being evaluated.

As yet another example, suppose that two images of a stationary vehicle are being captured by a camera (where the relative 3D position of the stationary vehicle to the camera is unchanged between the two pictures). The first image is taken by the camera at its native zoom level. The second image (in which the vehicle is visible) is taken with a magnified zoom level, thereby changing the pixel focal length of the camera. In the second image taken with the magnified zoom level, the vehicle will appear enlarged. Although the vehicle will be enlarged in the second image as compared to the first image, the same absolute depth or distance value for the vehicle should be predicted by the model.

As described herein, in order to facilitate accurate distance prediction, the above described example ambiguity is accounted for or removed by introducing structured prediction, where the prediction being made is structured or designed to be a prediction of a normalized representation of a 3D property (depth in this example). For example, physical height per pixel is predicted, or normalized depth is predicted. In this example, the physical model will produce different values in its normalized depth prediction for the two different images, but when multiplied by the pixel focal length (which is different between the two images), the same absolute object distance will be recovered.

Embodiments of the techniques described herein to facilitate depth estimation by using a model trained to predict a normalized depth quantity provide various benefits over existing techniques for depth prediction. For example, existing depth prediction techniques are trained for specific camera configurations (e.g., cameras with specific parameters, that are mounted in a particular way, etc.), or if the model is not specifically trained for a single camera, they are exclusively trained to predict relative depths, such as whether one object in the image is closer to the camera than another object in the image. In contrast, the models described herein are trained to work with various camera configurations to facilitate accurate estimation of absolute depth values.

At the end of the prediction process applied to the two images are final predictions in which the same absolute object distances are computed for the two images. However, it would be difficult to impose direct prediction of the absolute object distance on a model, where, as exemplified in the above example of two images of the same stationary object captured with different zooms, such a model would have difficulty determining that the vehicles in the two images actually correspond to the same depth. As described herein, to facilitate such a prediction, rather than attempting to have the model predict that the vehicles in the image are at the same depth, the model is instead structured or trained in a manner that allows the model to predict different values. By then multiplying the normalized depth predictions by the respective camera parameter values, the same absolute object distances can be recovered for the vehicles in the two images. As shown in this example, the problem of depth prediction is simplified for the model by allowing it to predict a normalized depth value instead of an absolute depth value.

The following is an example of using the predictive model at inference time. For example, a 2D RGB image is received (e.g., captured by a camera of an ego vehicle). The image is made up of a set of pixels. Each pixel (identified, for example, by two-dimensional indices in a matrix or array) is associated with an RGB value. For example, the RGB value for a pixel is represented using a vector of values between 0 and 255 indicating red, green, and blue light levels for the pixel. For example, the red component of the pixel is represented using an 8-bit vector representing a value in the range of 0 and 255. This value indicates the amount of the red component for the pixel. Similar values are encoded for the blue and green components of the pixel.

The RGB values for the pixels in the image are passed as input to the predictive model. As output, the predictive model predicts, for each pixel in the image, a normalized height or depth value (e.g., real value). As shown in this example, the model is trained to take as input an RGB image, where each pixel in the image is associated with three channels of data (red, green, and blue levels). The model is trained to make per-pixel normalized depth value predictions based on the RGB data of the pixels in the image being processed. The techniques described herein may be variously adapted to make predictions from other types of image channel data, as appropriate.

A segmentation model is used to identify the group of pixels in the image corresponding to a unique vehicle. The predicted normalized depth values corresponding to the pixels in the group of pixels identified as corresponding to the unique value are obtained and aggregated. A single normalized depth real value is determined for the identified unique vehicle. As part of the prediction, the object will occupy multiple pixels. The model will not necessarily have predicted the same value for each pixel that corresponds to the vehicle (in contrast to embodiments of training, where the pixels for known vehicles are all assigned the same normalized depth value as labels). For example, it may be the case that the model provides more fine-grained normalized depth values. The predicted normalized values are aggregated, such as by taking a specialized average that corresponds to a robust minimum value predicted by the model on this unique object instance (and not necessarily the absolute minimum value, which may be noisy). This is one example of handling of loss of fine-grained representation in post-processing.

For example, as described above, the normalized depth is a depth divided by pixel focal length, which is related to physical object height divided by pixel object height (e.g., number of vertical pixels occupied by the object in the image). In the case of a pinhole model, these values are equivalent. In this example, the inference is performed at the ego vehicle (for real-time object detection). The ego vehicle will have knowledge of the parameters of its camera system. At inference time, the normalized depth value, which is depth (e.g., in feet or meters, or any other unit of measurement as appropriate) per pixel focal length, is obtained. The pixel focal length for the imaging system of the ego vehicle is obtained. For example, the depth in meters per pixel focal length is multiplied by the pixel focal length to determine the depth in meters of the object from the (camera of the) ego vehicle. Note that in this example, the pixel focal length was used at inference time to recover the absolute depth from the predicted normalized depth value, but that the predictive model itself did not use the pixel focal length in order to make the predicted camera-invariant, normalized depth value. As described above, in this way, the model has been designed or trained in such a manner to generate predicted values that are normalized or invariant to the properties of the camera that took the image, which allows a single model to be trained and deployed to vehicles with various disparate types of imaging systems and camera parameters. In this way, training of the model is independent of, or not reliant on, having to know what specific camera systems with what specific parameters that the model will be deployed to. For example, while the parameters of a given vehicle's camera system may be known or accessible at the vehicle, such information is not necessarily known or available (and need not be used, using the techniques described herein) to a backend system such as model training and deployment system 200 when training the model. At inference time, the individual vehicles can use the model and supply their own locally known camera parameters to recover the absolute 3D properties of interest.

The techniques described herein may be variously adapted to other types of cameras. For example, consider fisheye cameras, which introduce distortions to a captured image. The following are embodiments of adapting the structured prediction techniques described herein to accommodate cameras such as fisheye cameras that introduce optical distortions or non-linearities to the captured 2D images.

As one example, a conversion operation is performed to convert an image taken with fisheye lenses to an undistorted version (e.g., correcting the distortion introduced by the fisheye lens) of the image (as if taken with a camera that can be modeled as a pinhole camera). The undistorted version of the image is then passed as input to the predictive model. In this case, the image produced by the fisheye camera is un-distorted and provided as input to the model, where the model can be used without retraining or fine-tuning on fisheye camera images. For example, the distortion correction is performed using image pre-processing engine 310 of FIG. 3A. The distortion correction described above can be applied to other types of 3D property estimation as well.

As another example, the predictive model is trained using training samples including training images captured with fisheye lenses. The same labeling (e.g., labeling of pixels corresponding to a unique vehicle with a normalized depth value or some other 3D property normalized to the units of a camera parameter) would be performed to generate the target label for the training sample. The model would then learn to handle such non-linearities. In this case, a single model is trained to handle arbitrary types of camera systems.

Figure 4B:
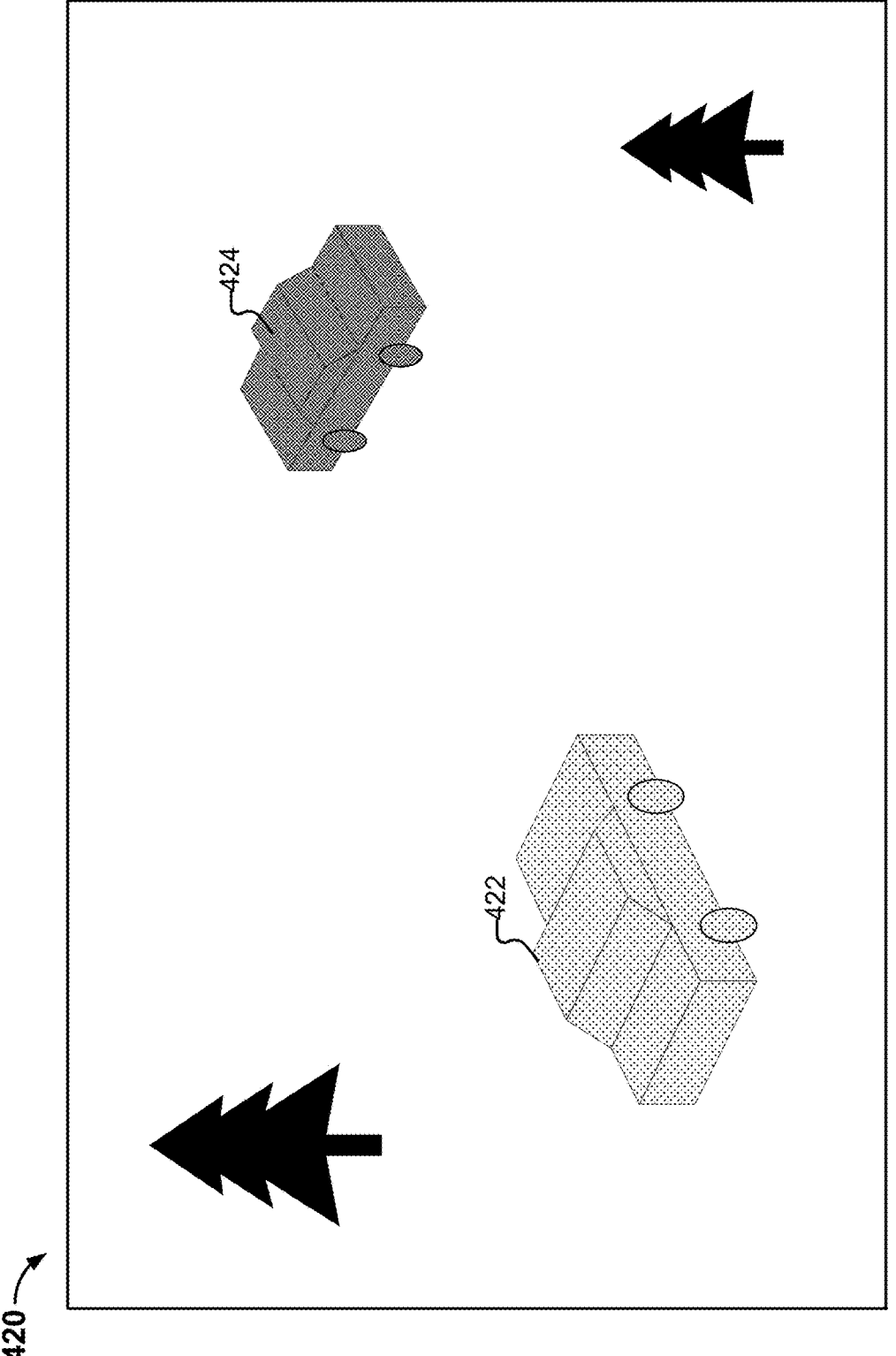
FIG. 4B illustrates an embodiment of a training sample usable to train a model for predicting normalized depth of vehicles in images.

FIG. 4B illustrates an embodiment of a training sample usable to train a model for predicting normalized depth of vehicles in images. For example, as training data, the model is provided as input an image corresponding to a particular data point. For example, the data point is an image such as image 420 corresponding to a scene with vehicles. For the vehicles, labels are assigned. The following are embodiments of producing such labels.

For each pixel corresponding to each unique vehicle in the image (where the vehicles are known in the training data), a normalized depth value is assigned as a label. In the example image 420, suppose that there are two vehicles visible, vehicles 422 and 424. In this example, the two vehicles are known. Also, the normalized depths (e.g., height/pixel or depth/pixel focal length) are computed and collected. In this example, for each pixel corresponding to each unique vehicle, the same real number (normalized depth value) is assigned, where the normalized depth value corresponds, for example, to the smallest depth value of that object normalized by pixel focal length.

For example, each of the pixels that vehicle 422 occupies in the image are assigned a same first corresponding normalized depth value. Separately, each of the pixels that vehicle 424 occupies in the image are assigned a second corresponding normalized depth value. In this example, the two different normalized depth values applied to the pixels of vehicles 422 and 424 are indicated by different shading patterns.

The image 420 is then passed to the model as input. The model then provides a prediction for each pixel in the image 420. A comparison is made between the predicted outputs for the pixels and the target labels. For example, the difference between the predictions and the target labels is calculated as part of computing the loss function. Based on the difference, the parameters of the model are updated (e.g., to make the predictions closer to the target labels). In some embodiments, the loss is only calculated for those pixels corresponding to the vehicle objects. For example, the loss calculated for other pixels is ignored and not used in updating the weights of the model. The determination of what pixels to ignore in the loss function (or to disregard in updating of model parameters) can be performed according to a mask that designates which pixels to ignore.

The following is an example of setting up the training data such that certain pixels will be ignored in the loss function so that they do not influence the updating or learning by the model. For example, suppose that the model being trained is specific to vehicle objects. In some embodiments, the training sample includes an ignore mask. In this example, the ignore mask includes values for pixels to not be trained on. In this example, all other pixels not corresponding to cars are assigned values in the ignore mask so that the predictions for those pixels are ignored and do not cause changes to the updating of the model. That is, for those pixels that are designated as being to be ignored, even if predictions are made for those pixels, those predictions are discarded or ignored. For example, losses computed with respect to pixels designated as to be ignored do not contribute to the updating of the weights of the model. Embodiments of the ignore mask described above may be utilized when training predictive models to predict other types of camera invariant quantities.

In some embodiments, the model is configured to produce predictions for an input image that are in the same size as the image itself, resulting in predictions per pixel of the input. For example, suppose a 200×200 pixel image is provided as input. A 200×200 prediction is provided as output (one output prediction value) per pixel in the input image. In this example, the input and output are in the same dimensions, where there is a one-to-one mapping between pixels to predicted values.

The inputs and outputs need not be of the same dimensions. For example, the model is configured to produce predictions in a manner such that the output's contents (predicted values) can be deterministically mapped to the input's contents (pixels). As one example, the model can be defined where the dimension of the output is smaller than the input. For example, a 200×200 pixel image is provided as input. The model generates as output a 100×100 size matrix of predicted values. As one example mapping, each predicted value is mapped to 4 pixels in the input image. In this case, a coarser prediction of normalized depth values is performed. The aforementioned mapping between input and output of the model is also applicable to models for predicting other types of camera-invariant properties.

The predictive model for normalized depth prediction can be implemented using a variety of architectures, such as a U-Net architecture, temporal models, vision transformers, Res-Nets (Residual Networks), CNNs (Convolutional Neural Networks), etc.

The following are further embodiments of generating training data for training embodiments of the predictive models described herein. In some embodiments, creating the training data set includes generating labels. In some embodiments, denoising of labels is performed to improve the quality of the labels used to facilitate training of a predictive model and improve the stability and accuracy of the model's predictions. The denoising can be performed as image pre-processing when predicting other types of camera-invariant quantities as well.

For example, in some embodiments, the training images that contain vehicles are obtained from videos. For example, the training images are frames in a sequence of frames that make up a video. The use of video frames provides various benefits, such as the ability to track unique objects over space and time. The images obtained from video are an example of training data 204 that can be used to facilitate training of models to make other types of camera-invariant predictions (e.g., the same training image can be assigned labels for both camera-invariant depth prediction, camera-invariant orientation prediction, etc.).

For example, a vehicle in the video will not only be visible for a single frame, but for numerous frames (e.g., 400 frames or so). Suppose that the video is captured using a camera mounted to an ego vehicle. Suppose also that the ego vehicle has a second sensor, such as a LiDAR (Light Detection and Ranging) sensor that is used to measure the distance to the vehicle. The LiDAR depth measurements are correlated with the frames of the video such that the depth of the vehicle in the image is tracked. The normalized depth representation assigned to the pixels corresponding to the vehicle in the image frame is then computed from the corresponding LiDAR depth measurement.

As another example, the depth measurement (used to generate the label) is determined based on information pertaining to the camera that captured the video frames. For example, the depth information can be produced using the parameters of the camera as well as other known quantities of the camera system, such as its known location at a rigid height from the road surface (although this may result in noise as roads are not perfectly flat objects, in which case denoising may be performed).

In this example, the frames of the video are separated in time, such as captured at intervals of 100 milliseconds. Suppose that it is observed or measured that the vehicle in one frame is at 10 meters of depth. In the next, second frame, which is approximately 100 milliseconds after, the vehicle is measured at 100 meters of depth. In a third frame, the measured depth of the vehicle is 11 meters, and in a fourth frame, the vehicle is measured at 12 meters. In this example, the second measurement of 100 meters of depth for the vehicle is a noisy measurement. For example, it would not be physically possible for the vehicle to have a change in measured depth of 90 meters in the time between the first frame and the second frame. In some embodiments, a physicality filter is used to correct such noise predictions and improve label quality. For example, the second LiDAR measurement of 100 meters of depth is not used as a label. As another example, an interpolated depth is determined for the vehicle in the second frame based on the measured depth of the vehicle in the surrounding first and third frames. In some embodiments, the noisy depth measurement value is corrected using a smoothness constraint.

The noise correction in depth measurements described above results in improved and denoised labels (normalized depth representations) for the vehicle in the image frames, where the predictive models are then trained using these improved and denoised labels. By performing the denoising described above, label quality is improved, which in turn improves training of the model (as well as the stability and accuracy of the model).

In various embodiments, the predictive models described herein are trained to make normalized depth predictions from single images. However, the training need not rely on labels coming from single images. For example, while the model is trained using single images, because the images are frames of a video, where the frames are temporally consecutive to each other, the depth information of the other frames (e.g., the surrounding frames) can be used to improve the accuracy and reduce the noise of labels for specific frames, prior to training, and before the frames are presented as training data to the model to learn.

In some embodiments, the techniques described above for denoising labels prior to training can be adapted to denoise predictions at inference time (e.g., as part of post-processing).

For example, objects can be tracked during inference, and if outlier predicted values emerge from the model during inference, then those outlier predictions can be corrected. As one example, the correction is implemented by employing a Kalman filter. By using such a filter, the outlier values can be denoised during post-processing at inference time to improve the stability and the accuracy of the model's predictions. Note that in some embodiments, the predictions are made as an image frame is captured (e.g., where the camera is taking a video that is a sequence of image frames), and in some embodiments, the denoising during inference is performed based on predictions for past, historical frames (this is in contrast to denoising of labels, in which, for a given frame, both past and future frames relative to the given frame can be used to facilitate denoising).

The denoising techniques described herein may be variously adapted to denoise predictions of other types of camera-invariant quantities (such as relative orientation predictions, further details and embodiments of which will be described below).

The following are further embodiments of generating training samples and training labels. In some embodiments, a distribution of labels is determined and utilized that covers the test distribution. For example, if a model is to be used for predicting depths for vehicles from 0-200 m, but the model is only trained on images with instances of vehicles that belong to the 0-100 m range, then the model should not be expected to make reasonable predictions for instances of vehicles that are between the 100 m-200 m range, as it has not learned on any images with vehicles in that range of distance/depth. Thus, in some embodiments, images with a distribution of depths for objects are utilized. For example, partitions are crated for images that contain vehicles in different ranges (e.g., 0-10 m away, 10-20 m away, 20-30 m away, etc.). This allows the predictive model being trained to have an understanding of the world (and the various depths at which vehicles can be from an ego vehicle) that is not biased by the distribution of the data that has been collected.

In some embodiments, in addition to images with vehicles at a distribution of various depths, distributions for different regimes of operation in producing a model are considered. For example, the training data not only includes instances of vehicles at various depths, but also vehicles of different types and shapes (e.g., trucks, buses, sedans, hatchbacks, etc.), of various colors, at various times of day (e.g., nighttime versus daytime), under various weather conditions, etc. Such diversity in the training data improves the ability of the model to make accurate predictions of objects at inference time. The distribution of characteristics of training images is applicable to training of models for determining other types of camera invariant properties as well.

The following are further embodiments of training, including augmentations in training. Such augmentations include geometric and/or image domain augmentations. For example, it would be beneficial in the autonomous driving context if the depth prediction model were able to make accurate predictions, even when the road is bumpy. For example, even if the camera jumps up and down, the depth predictions should not drastically change. In some embodiments, augmentations are performed during training to facilitate achieving such stability for inference time processing.

Examples of augmentations include virtually rotating the camera up and down, virtually rotating the camera to the left or right, etc. Other examples of augmentations include transformations such as zoom in or zoom out, so that a single value of the pixel focal length is not only relied on, but can attain the desired invariance. Other augmentations include making the training images dimmer and or drastically more lit up (e.g., to simulate sunny conditions). The augmentations result in the generation of new images (augmented as described above), to enrich the input distribution of training data and increase the level of invariance of the model to details that should not be fundamental in its predictions. For example, given a training image with a training label, an augmentation is applied to the training image to generate an augmented training image. In some embodiments, a corresponding augmented training label is also determined, where the augmented training label is derived from the training label and based on the augmentation that was applied. For example, if the augmentation that is applied is to simulate increasing the pitch or decreasing the pitch of the camera, the depth value will also change. As the augmentation is known, and the change of the depth value is known, the new label for the augmented image can be determined. The model is then also trained to predict the augmented label as a target label. In this example, the label value changes in accordance with the augmentation that is applied. Other augmentations (e.g., simulating of up and down movement in the image domain) may not result in changes to the depth value, and the same depth value used in the original source image (upon which the augmentation is performed) is applied to the augmented image as well.

3D Bounding Box Orientation Estimation

In the following examples, embodiments of structured orientation prediction are described.

Figure 5A:
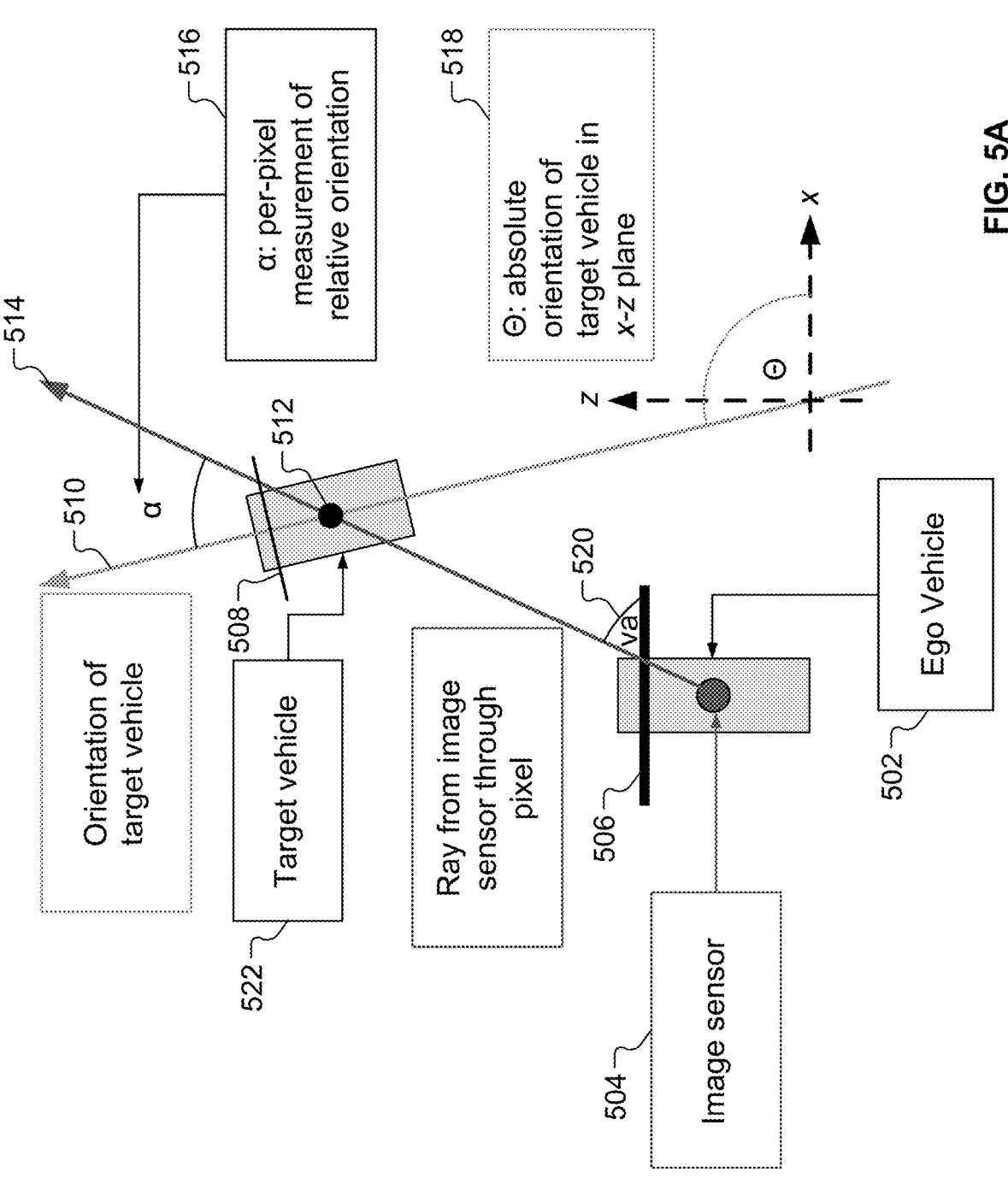
FIG. 5A illustrates an embodiment of orientation estimation.

FIG. 5A illustrates an embodiment of orientation estimation. In some embodiments, similar to as described above with respect to distance estimation, for estimating the orientation of minimal 3D bounding boxes for an object such as a target vehicle, a quantity is defined that is invariant to the parameters of the camera that took an image containing the object. Referring to the example of FIG. 5A, instead of predicting Θ (518) (orientation/angle of heading relative to heading of ego vehicle), which is dependent on camera parameters, the quantity α (516) is predicted, which is dependent only on the appearance of the vehicle captured in the image (e.g., portion of the vehicle seen in the 2D RGB image). Using the camera parameters (e.g., the field of view and the focal length), the absolute orientation Θ is recovered by computing the angle between the ray from the image sensor to the target vehicle and the predicted angle α.

The following are further details regarding the example of FIG. 5A. In this example, a top-down birds-eye view is shown. In this example, ego vehicle 502 has an image sensor (camera) 504. The front of the ego vehicle is shown at 506. In this example, a target vehicle 522 is also shown. The front of the target vehicle is shown at 508. In this example, arrow 510 (also referred to herein as the object heading direction or object heading ray) indicates the direction of potential forward movement of the target vehicle. For example, if the target vehicle were to proceed forward, it would move along the direction of arrow 510.

For illustrative purposes, suppose a projection on the bird's-eye view plane of the physical center 512 of the target vehicle. While the location of the physical center of the target vehicle will not be required in the orientation prediction described herein, the representation of the physical center is described in conjunction with the example of FIG. 5A for illustrative and clarity purposes.

In this example, viewing direction or viewing ray 514 is a ray or line emanating from the camera that, in this example, is shown to pass through the center 512 of the target vehicle. This line is referred to as a viewing raw or viewing direction for the object instance (target vehicle in this example).

In this example, an angle α (516) is defined as a relative angle between the object viewing direction 514 and the object heading direction 510. This relative angle is also referred to herein as a relative orientation measurement. As another example, the relative orientation is the angle between the direction in which the target vehicle or object is visible in the camera, and the direction that the object can potentially move in if it were to move forward.

In this example, structured orientation prediction is facilitated by training a predictive model to estimate the relative orientation value a, rather than directly predicting the absolute orientation of the target vehicle (e.g., absolute orientation 518 in the x-z plane in the example of FIG. 5A).

For example, the final value to be predicted is the moving direction of a specific object of interest with respect to the ego vehicle. In the context of autonomous driving, it would be beneficial to determine where the object will be proceeding for intent prediction for path planning. For example, if the target vehicle were to move in the direction indicated by heading direction 510, then it will be in the potential movement direction of the ego vehicle, and path planning should be performed to avoid collision.

In some embodiments, the orientation predicted is used to facilitate drawing of a 3D box surrounding the target vehicle. The predicted orientation is used to determine how to orient the 3D box (representing the target vehicle) in 3D space relative to the ego vehicle. The predicted parameters of the 3D box facilitate the making of various decisions, such as whether the ego vehicle has sufficient space to move where it would like to proceed, as well as other scenarios.

To facilitate determining the absolute orientation of the target vehicle with respect to the ego vehicle, determining of the relative orientation quantity 516 is beneficial. For example, the relative angle is determined based on how the object is represented in the image. Even if the camera were rotated (with the object in the same place) and another image of the object were taken, if the object were perceived to have generally the same appearance in the image, then the angle between the object's heading and the viewing ray should be approximately the same. For example, even if the camera were rotated, what is visible and what is not visible of the target vehicle in the images would be the same in the images captured prior and subsequent to the rotation.

This is in contrast to attempting to directly predict the absolute orientation 518. For example, suppose a stationary target vehicle. Suppose that a camera system is pointed directly at the stationary target vehicle, and a first image including the object is taken. Now suppose that the camera system is rotated, and a second image including the object is taken. The appearance of the stationary target vehicle (e.g., what is visible of the target vehicle in the images) is largely the same. However, the absolute orientation between the heading of the target vehicle and the ego vehicle has changed dramatically. In this case, it would be challenging to train a model that can take in the two images, in which the appearance of the cars is very similar but have to predict drastically different values for the only slightly different input data.

Structuring the prediction task such that the model predicts the relative angle described herein based on the appearance of the target object in an image simplifies the training task and results in a more stable and accurate model. For example, designing a model that predicts such a relative angle quantity allows the model to learn to predict similar values for similar inputs (e.g., similar appearances of vehicles captured in input images), rather than having to learn how to predict very different output values for similar inputs.

In this example, the orientation model is trained such that if it observes similar input in two images (e.g., similar parts of a car are visible in the two images), then similar output will be predicted.

After predicting of the relative angle α, the absolute orientation of the heading of the target vehicle relative to the heading of the ego vehicle can be determined by applying accessible camera parameters (e.g., field of view and/or focal length) to the per-pixel predicted a relative orientation values.

As shown in the above example, in some embodiments, the absolute orientation of the target vehicle relative to the ego vehicle (e.g., angle between heading of target vehicle and heading of ego vehicle) is determined based on the relative orientation a and the location of the target vehicle in the input image. For example, the location of the target vehicle in the input image (e.g., if it is in the left side of the image, right side of the image, center of the image, etc.) is used to determine the viewing direction. For example, suppose that the camera that captured the images is mounted on the center of the car, facing the front of the car (pointed forwards, in the direction that the ego vehicle is pointed). If the target object is in the center of the image, then the viewing direction is in the same direction as the heading of the ego vehicle. On the other hand, if the target vehicle is in the right side of the image, then the viewing direction towards the target object is at an angle relative to the heading direction of the ego vehicle (e.g., to the right of the ego vehicle heading direction from a bird's eye perspective). If the target vehicle is in the left side of the image, then the viewing direction towards the target object is also at an angle relative to the heading direction of the ego vehicle (e.g., to the left of the ego vehicle heading direction from a bird's eye perspective). At inference time, accessible parameters of the camera system are used to determine the angle between the viewing direction to the target vehicle of interest and the heading direction of the ego vehicle. This angle is then combined with the relative orientation angle predicted for the target vehicle to compute the absolute orientation of the target vehicle to the ego vehicle (e.g., angle between projected heading direction of the target vehicle and projected heading direction of the ego vehicle, or absolute orientation of the target vehicle in the x-z plane of FIG. 5A). For example, referring to the example of FIG. 5A, the angle 520 of the viewing ray to the target vehicle (relative to the x-z plane) is determined based on where the target vehicle is located in the input image, and camera parameters such as field of view and focal length. The determined angle of the viewing ray is then combined with the predicted relative angle prediction to determine the absolute orientation 518 (e.g., by summing angle 520 and predicted angle α 516 (which is between the viewing ray and the heading direction of the target vehicle)).

While examples of determining 3D orientation of vehicles and pedestrians in the context of autonomous driving are described for illustrative purposes, the 3D orientation estimation techniques described herein may be variously adapted to accommodate 3D orientation estimation for any type of object. Further, the estimation techniques described herein are not limited only to yaw estimation, but may be adapted to estimate the pitch and roll of the 3D bounding box.

Figure 5B:
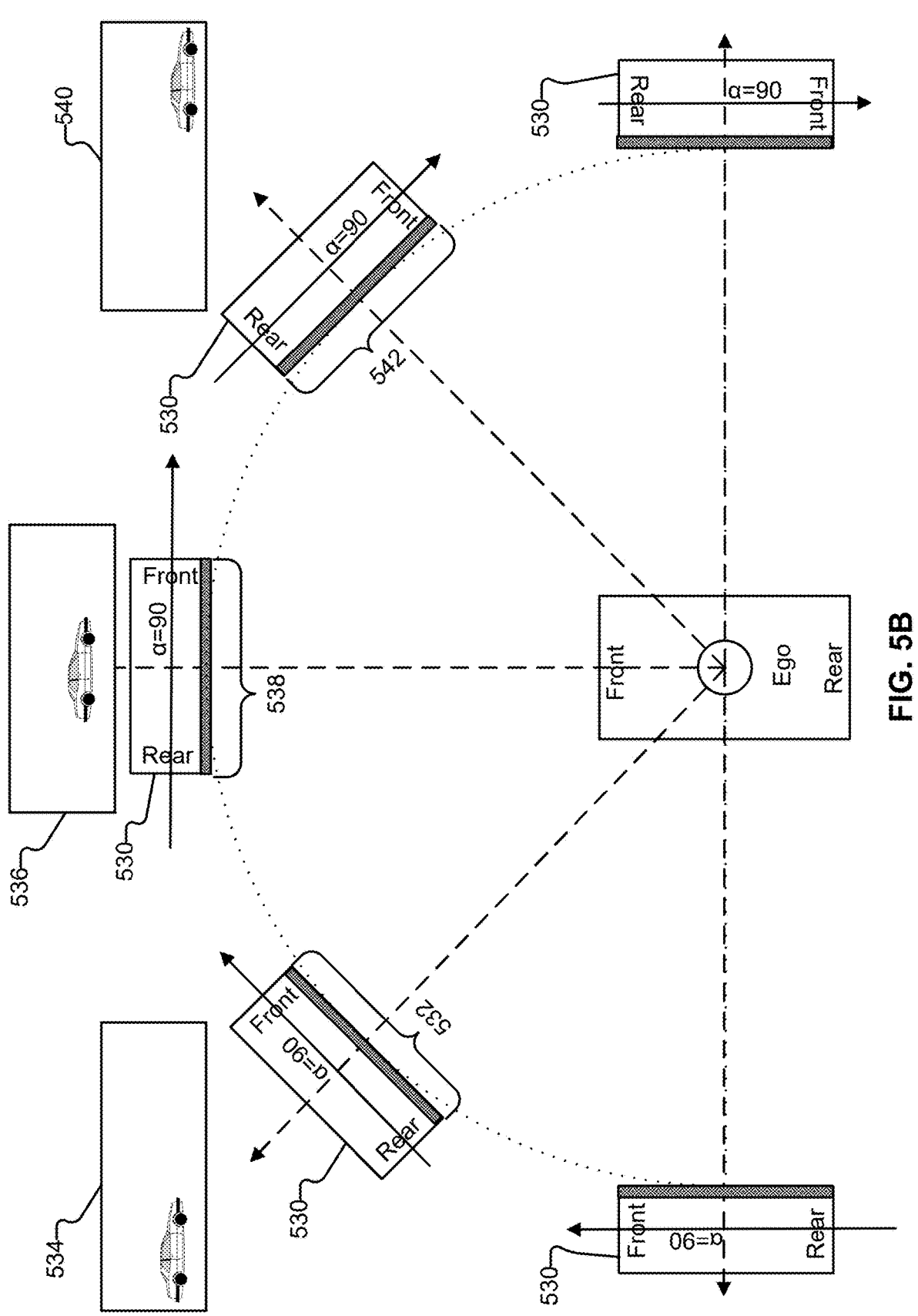
FIG. 5B illustrates an embodiment of camera-invariant orientation estimation.

FIG. 5B illustrates an embodiment of camera-invariant orientation estimation. In this example, suppose a target vehicle (530) driving in a semi-circle path (clockwise) around a stationary ego vehicle.

Suppose that in this example, as the target vehicle drives along the semi-circle path, the camera system mounted on the stationary ego vehicle captures a sequence of images (e.g., video). In this example, the camera recording system is in a fixed position when capturing the sequence of images (e.g., is not rotating during the sequence).

In this example, suppose that the following three images are captured that include the vehicle. In the first image, the target vehicle is captured when it is at position 532 relative to the ego vehicle. In this example, in a first captured image 534, from the perspective of the front of the ego vehicle (the direction in which the camera system is pointed), the target vehicle is left of center in the first image.

Suppose that in a second image 536, the target vehicle is captured when at position 538 relative to the ego vehicle. In this example, the target vehicle is in the center of the second image.

Suppose that in a third image 540, the target vehicle is captured when at position 542 relative to the ego vehicle. In this example, the target vehicle is right of center in the third image.

In this example, as the target vehicle traces the semi-circle path, roughly or nearly the same portion or profile of the target vehicle (passenger side of vehicle in this example) is captured in the three images. For example at each instance on this path, the vehicle, as captured, will look similar in the image instances. That is, though translated (in different regions of the three images), the three images have the same or similar local patches of pixels that correspond to a same view of the target vehicle, for example, only the passenger side (or right side) of the vehicle (and perhaps a bit of the front). For all of these instances, given the same part of the image being captured in the different images, the model predicts the same relative orientation angle quantity (which is desired). In this example, the relative orientation angles are all approximately 90 degrees. For example, in the three images, the same side of the vehicle is visible. For example, in two different images, the same side of the vehicle is shown, and the same quantity is therefore predicted. This is because the content with respect to the vehicle is semantically the same or similar in the two different input images (even if translated). The model is trained to make similar predictions for patches or collections of pixels that have similar semantic content or characteristics or features.

It is desirable for the model to predict the same a angle because the input (patch corresponding to the target vehicle) is the same (or approximately the same) at each of the instances, and the same quantity should be predicted. For example, if the side of the car is the portion of the vehicle that is visible in the image (and was captured by the camera), then this is a signal that is indicative of the heading of the car (relative to the viewing direction from the camera to the target object).

In this example, although the location of the target vehicle changes (is translated) between the three images, the appearance of the vehicle (e.g., what is visible of the target vehicle) is largely the same in the three images. In this example, because the same portion of the target vehicle is being visualized in the three images, the alpha angle predicted for the target vehicle in the three images should all be the same. That is, the camera-invariant orientation model is trained to determine, for visually similar local patches (corresponding, for example, to the same portion of a vehicle being visualized in the image) in images, the same alpha angle (relative orientation), as the portion of the vehicle that is visible in an image is indicative of the heading of the vehicle relative to the viewing ray.

As shown in this example, between the three images, the quantity to be predicted has not changed. The model should predict the same relative orientation angle in all three images. It is beneficial to create a model that produces such a prediction. For example, when the viewing direction of a camera changes (e.g., different viewing rays from camera to target object), the image representing that object only minimally changes. For example, whether an object is viewed or perceived directly or peripherally, the perceived appearance of the object will only slightly change.

In the above examples of FIGS. 5A and 5B, given an input image including a target vehicle, the camera-invariant orientation model described herein predicts a relative orientation for the target vehicle that is determined as the predicted angle between the vehicle's heading and the viewing direction emanating from the camera that captured the image. In some embodiments, the absolute orientation for the target vehicle is determined by computing per-pixel absolute orientation values from the per-pixel a predictions made for those pixels in the input image identified as pertaining to a unique target vehicle or object instance (e.g., using a segmentation model at inference time, as described above). A single absolute orientation value for the target vehicle is estimated by aggregating the per-pixel absolute orientation values. Further details regarding such aggregation are described below.

The following are embodiments of an implementation of a relative orientation prediction model. In some embodiments, the orientation prediction model is implemented using a convolutional neural network (CNN). The models described herein may also be trained with other architectures such as transformers. By structuring the prediction to be based on relative orientation a, the similarity of the model's predictions is locally preserved. For example, CNNs are co-variant models. For example, suppose that the relative orientation prediction model is given two images captured by a camera. One is an image, where a portion of the image includes vehicle image content (e.g., set of pixels) corresponding to a vehicle. The second image corresponds to a rotation of the camera, where the image still includes the same vehicle image content, but located in a different region of the second image, as compared to the first image. Although the location of the vehicle image content is translated or shifted in the second image as compared to the first image, because the vehicle image content is the same, the CNN architecture will produce locally (e.g., with respect to the patches of the same vehicle image content) the same predictions. In this case, the image varied, and the predictions covaried with the image varying. Locally speaking, the signal (vehicle image content) did not change in the images (although globally speaking, the vehicle image content was translated between the two images). For example, a CNN is an example of a model that is co-variant, where if the contents in the input move in the image domain, the per-pixel predictions also move with the content. In this case, training a model to predict such a relative angle $\alpha$ is a form of structured prediction that simplifies the learning task for the model architecture (and makes the learning task one in which predictions can be made stably).

As shown in this example, the model makes local predictions that co-vary in the way that the input is changing. Using the models described herein, the model is trained to produce similar predictions when it sees similar inputs that are similar locally. Such local invariance, or covariance (globally speaking), which is appropriate for CNNs to impose, is beneficial. The relative orientation formulation described herein simplifies the learning task for the model. Attempting to train a model to predict absolute orientation quantities that are drastically different compared to each other, but on local patches of the image that correspond to similar objects, is difficult, as it would be in contrast to the way in which the model was architected.

In the above example, the property of CNNs, in that they are invariant in their predictions for similar-looking patches of an image, is leveraged. For example, such a property is leveraged to predict similar quantities for similar-looking objects. As such, the structured prediction described herein (training to predict relative angle orientation from vehicle appearance visible in image) is chosen to predict the same (or similar) quantity for objects that appear locally similar in input images. As described above, one example of this invariance is that when the camera is rotated, although the location of the object in an image will change, the visual appearance of the object does not change much (with perhaps minor or relatively small distortion), and the same quantity should be predicted (if the same visual appearance of the object is present, then the same quantity should be predicted). For example, the prediction is structured such that given similar visual appearances of objects in images, similar output quantities are predicted. CNNs are suitable for such types of structured prediction, as they are architected to predict similar quantities for objects that look similar, even if located in different regions in an image.

As described above, the relative orientation predictive model is trained to produce similar predictions for similar vehicle appearances (e.g., if the same part of a car is visible in the image, then a similar set of predictions is made). The predictions made by the relative orientation model described herein are invariant to, for example, rotation of the camera. Rather, the prediction for the object is made based on the appearance of the part of the object that is visible in the input image. If in two images, the same parts of vehicles are visible (e.g., rear three-quarter view or perspective of vehicles is captured), then the same (or similar) relative orientation angle will be predicted. That is, the same semantic content is present in patches of pixels in the images (vehicles captured both from the same rear three-quarter view) and so the same relative orientation value should be predicted. On the other hand, if different parts of vehicles are visible in the two images (e.g., one image shows the passenger side of a vehicle, and the other image shows the rear of a vehicle), then different relative orientation angles will be predicted for the vehicles in the two images. For example, different values are predicted for different looking input. Similar values are predicted for similar looking input (e.g., where similar looking input includes collections or patches of pixels that have similar features). Such a type of structured prediction can be stably made by the model. In addition to allowing the model to make its predictions stably, by making the model predict similar quantities when it is presented with similar content images, a relatively small model can be used to more efficiently make predictions of such camera-invariant properties.

The following are further embodiments regarding the relative orientation value a. The selection or construction of the relative orientation value a for structured prediction as described herein provides various benefits. For example, similar to the normalized depth representation described above, a model trained to predict quantities of this type (relative orientation value a) produces predictions in a manner that is not reliant on knowledge of the parameters of the camera setup. Rather, similar predicted values will be generated for objects that present similarly in images, regardless of the parameters of the camera setup used to capture the images. The following are further details regarding such invariance. For example, suppose a camera that has an adjustable optical zoom. Suppose that the location of the camera does not change, but the user adjusts the camera to zoom in or zoom out on the scene. In this case, the field of view is decreased or increased. A model trained to attempt to directly estimate the absolute orientation of a target vehicle would have difficulty accurately making its predictions given the change. In contrast, the camera-invariant models described herein, which are trained to predict relative orientation values a, would be able to consistently predict the same or similar values of a. For example, although a target vehicle will appear larger or smaller in images if the zoom level is changed, the object's appearance does not change from a semantic perspective. The model described herein, given its training, would apply the same or similar relative orientation a given the same or similar semantic content. As shown in this example, the value a is independent (or invariant) of scale.

The following are further embodiments of per-pixel relative orientation prediction. In the above examples of FIGS. 5A and 5B, a viewing direction through the geometric center of the target vehicle instance was shown for illustrative purposes. The relative orientation prediction techniques described herein do not necessarily require, or are not necessarily dependent on, the determination of a geometric center of a vehicle, which can be challenging.

Figure 5C:
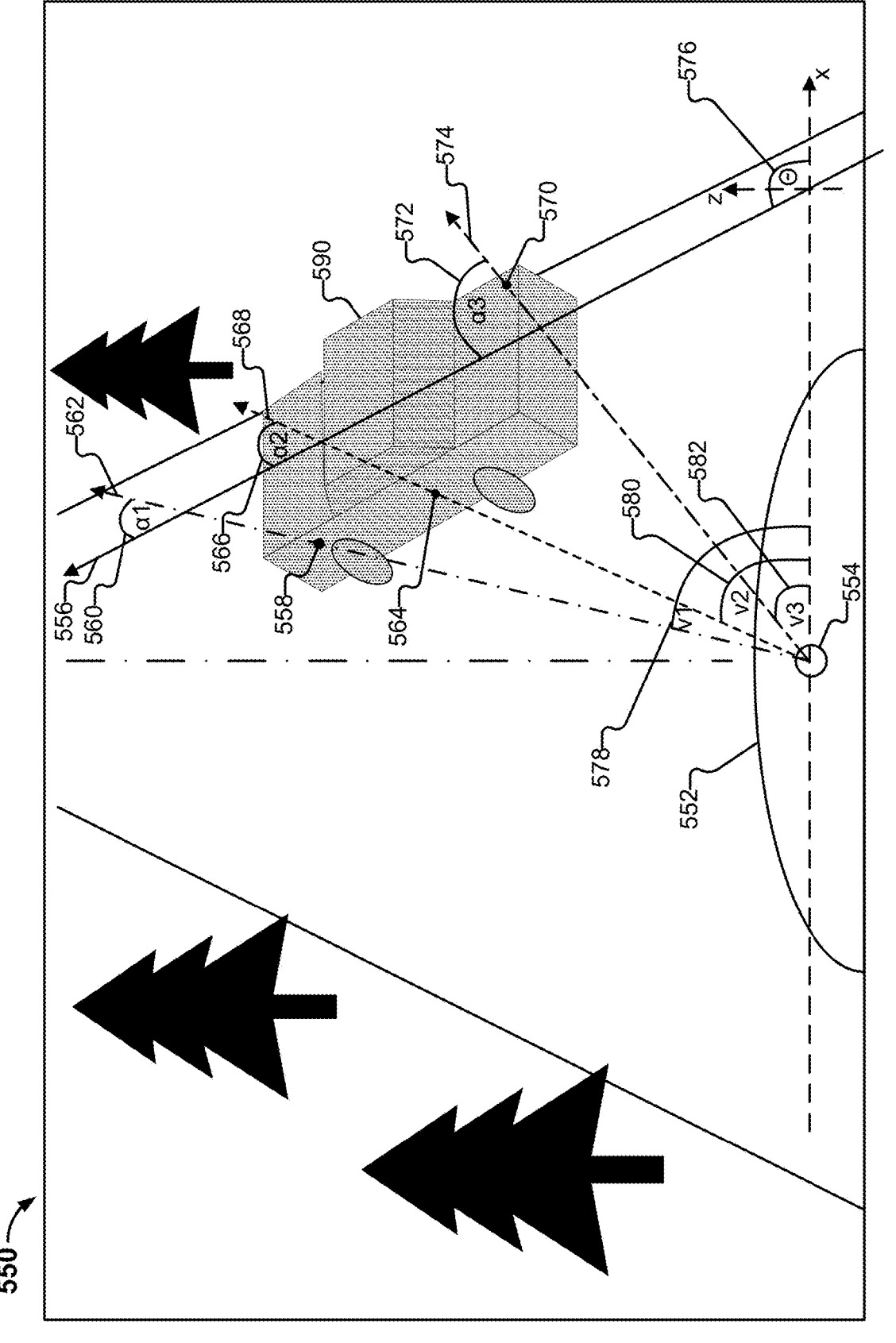
FIG. 5C illustrates an embodiment of per-pixel relative orientation prediction.

FIG. 5C illustrates an embodiment of per-pixel relative orientation prediction. Shown in the example of FIG. 5C is an image 550 captured from a camera recording system mounted to the top of an ego vehicle. In this example, the hood (552) of the ego vehicle is shown in the captured image. In the example image 550, the projection of the camera's focal center is at 554.

In some embodiments, the relative orientation predictive model is configured to predict a relative orientation for each and every pixel in the image. This includes producing predictions for pixels that correspond to target vehicle 590 that was captured in the example image 550. In the image, the target vehicle is not represented by only one pixel, but by a collection of pixels.

In the context of the vehicle, the predictive model will compute values for each pixel that happens to correspond to the car. Because the car is represented using multiple pixels, this will result in different relative orientations being predicted for different pixels belonging to the car. This is because, while the heading direction 556 of the vehicle would be the same, the viewing direction/image ray angle for each pixel is different. For example, the predicted relative orientation angle for pixel (558) is $\alpha_1$ (560) given the pixel's viewing direction 562. The predicted relative orientation angle for pixel (564) is $\alpha_2$ (566) given the pixel's viewing direction 568. The predicted relative orientation angle for pixel (570) is $\alpha_3$ (572) given the pixel's viewing direction 574. As shown in this example, the per-pixel predictions of $\alpha_1$, $\alpha_2$, $\alpha_3$ are each different given their different viewing angles.

Ultimately, the desired output of the orientation estimation is an absolute orientation angle 576. The following is an example of determining an absolute orientation angle for a pixel (e.g., at inference time). An absolute orientation angle is determined for each pixel determined to correspond to vehicle 590 (e.g., where the collection of pixels in the image corresponding to the vehicle object is determined using a segmentation model, as described above). For example, consider pixel 558. The relative orientation angle $\alpha 1$ is predicted for that pixel. Camera parameters of the camera recording system, such as field of view and focal length, are obtained (e.g., accessed at the ego vehicle). The viewing angle of imaging ray 562 is determined based on the location of pixel 558 in the image (e.g., based on its indices in the image 550) and the field of view/focal length. In this example, the absolute orientation angle (e.g., relative to baseline of x-axis in the x-z plane, similar to as shown in the example of FIG. 5A) predicted for pixel 558 is determined as the sum of the viewing angle 578 determined for pixel 558 and the predicted orientation angle $\alpha 1$ predicted for pixel 558. Predicted absolute orientation angles for each pixel belonging to the vehicle are similarly determined.

As shown in this example, every visible pixel on the vehicle has its own viewing angle. Across the visible pixels for a target object instance (e.g., pixels corresponding to the visible portion of a vehicle), there will be slight variations of the predicted relative orientation angles.

Although each pixel of the vehicle will have a slightly different relative orientation angle predicted because of the difference in viewing direction for each pixel, there will be an additional step to recover, for each per-pixel, a predicted absolute orientation. In some embodiments, the predicted absolute orientation is determined for a given pixel based on the predicted relative orientation value, the viewing direction for that pixel, and the camera parameter. For example, as shown above, for each pixel, its determined viewing angle is combined with the predicted relative orientation angle (angle predicted to be between the viewing angle of the pixel and a heading direction of the object to which the pixel belongs) to predict the corresponding absolute orientation. As a result of the viewing directions of each pixel also being different, the absolute orientation values recovered for each pixel will be the same. That is, the absolute orientation values ultimately recovered or determined for each pixel will be the same. In the example of FIG. 5C, $\alpha_1 + v1 = \alpha_2 + v2$ (580)=@3+v3 (582)=0. That is, although the predicted relative angles $\alpha_1$, $\alpha_2$, $\alpha_3$ are different, because the final predicted absolute orientation for each pixel is based on the pixel's own viewing angle (which are different for the three pixels), the same absolute orientation value is recovered.

As shown in the above example, while the relative orientation angles computed for each pixel will be different, after recovery, the absolute orientation value predicted for each pixel will be the same. While the absolute orientation for each pixel corresponding to a same target object should be the same (where the labels determined for pixels of a same vehicle in a training image would be computed to have the same absolute orientation value, and so different pixels would have different relative orientations a assigned as labels because the pixels' viewing angles are different), at inference time, the individual per-pixel absolute orientation predictions may vary. In some embodiments, to determine a single predicted absolute orientation value for the target object, an aggregation is performed using the predicted absolute orientation values for the pixels determined to belong to a target object (e.g., where the pixels belonging to the object are determined according to a segmentation model). The aggregation of the per-pixel absolute orientation values is performed to determine a single estimated absolute orientation value for the target object.

This approach, in which per-pixel camera-invariant predictions are made, has various benefits. For example, the per-pixel camera-invariant predictions are not sensitive to occlusion. For example, the model is insensitive to whether a target vehicle is fully visible or partially occluded. This is because the quantity predicted for each pixel remains the same, because it is dependent on the pixel's own viewing direction. For example, the quantities predicted for the pixels of an object are not dependent on any specific viewing direction of any specific pixel of the object. As one example, the per-pixel quantities do not rely on the model having to determine global context of objects, such as the object's geometric center point or centroid, which would be challenging. For example, in addition to the model having to learn global context of objects in training images, estimates of such values such as geometric centers of objects would have to be estimated if what is visible of an object is truncated. For example, estimating the geometric center of the vehicle is challenging in the real-world due to the occurrences of situations such as occlusion. For example, if in an image, there are multiple vehicles, where one vehicle is covering a portion of another vehicle, then the geometric center of the vehicle that is partially occluded would have to be estimated.

Predicting the geometric center of an object in an image to in turn make a prediction of orientation would also be challenging at inference time, and would result in multiple estimations to have to be performed to make the final prediction for the object. This could result in compounding of errors, resulting in inaccuracies in the final prediction for the object.

In contrast, using the techniques described herein, a relative orientation angle is predicted on a per-pixel basis. A pixel's respective viewing angle is also determined (e.g., using accessed or available camera parameters). An absolute orientation value is predicted for each pixel, based on the pixel's own viewing angle (rather than, for example, the viewing angle for a specialized point of an object such as its estimated geometric center). In this way, the absolute orientation angle will be computed to be roughly the same for each visible pixel given its own viewing direction. The quantity predicted for each pixel will remain the same, regardless of whether the vehicle is fully visible or partially occluded, because the predicted quantity is based on the pixel's own viewing direction (and not the viewing direction of a pixel corresponding to a center of a vehicle, which may or may not be visible in an image).

As shown in the above example, rather than having to learn global context (e.g., where the center of a vehicle object is) in order to make an orientation prediction, the relative orientation model described herein is trained to learn smooth variation of the quantity that is to be predicted, where this variation or change happens locally for a unique object. Training a model to make per-pixel predictions (where the model may learn on its own relationships based on surrounding pixels) removes the need for, or sensitivity to, additional global context information to make an accurate prediction.

As shown in the above example, while ultimately, at the vehicle, the camera parameters are accessed and used to determine an absolute 3D property, the camera parameters are applied to a quantity that is predicted by a model that is not reliant on knowledge of the camera parameters.

Figure 6A:
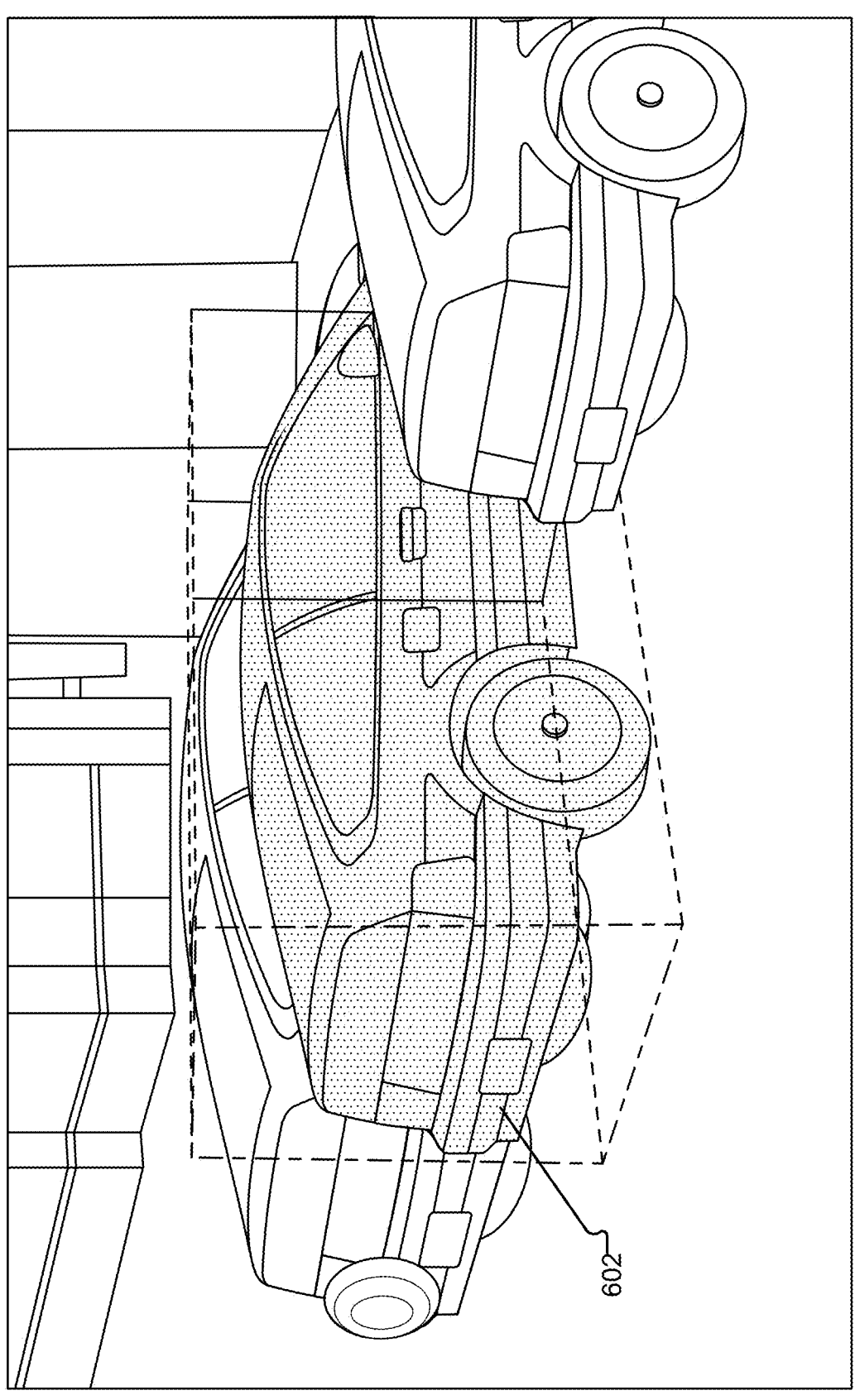
FIGS. 6A-6C illustrate examples of training samples for training a relative orientation prediction model.
Figure 6B:
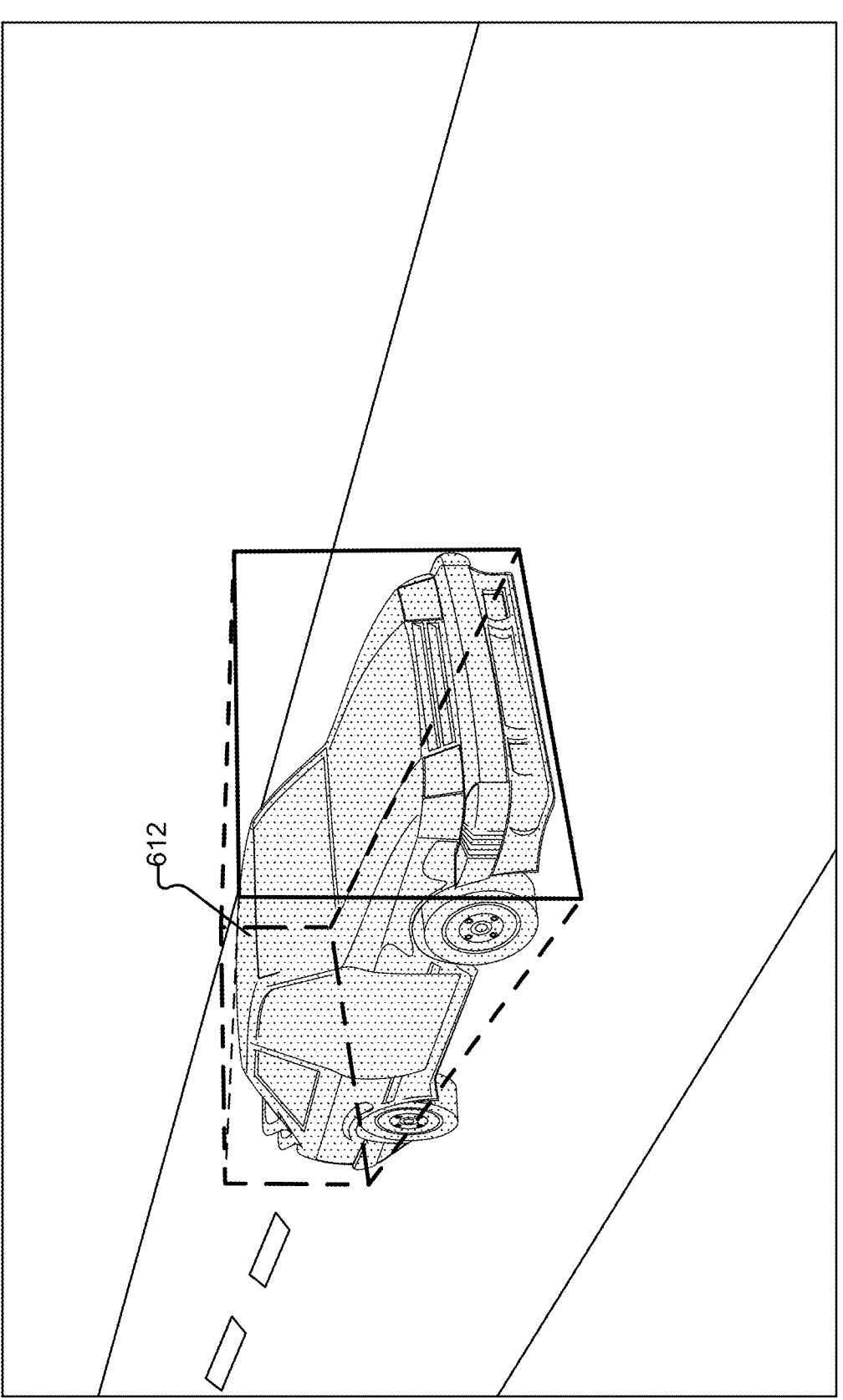
Figure 6C:
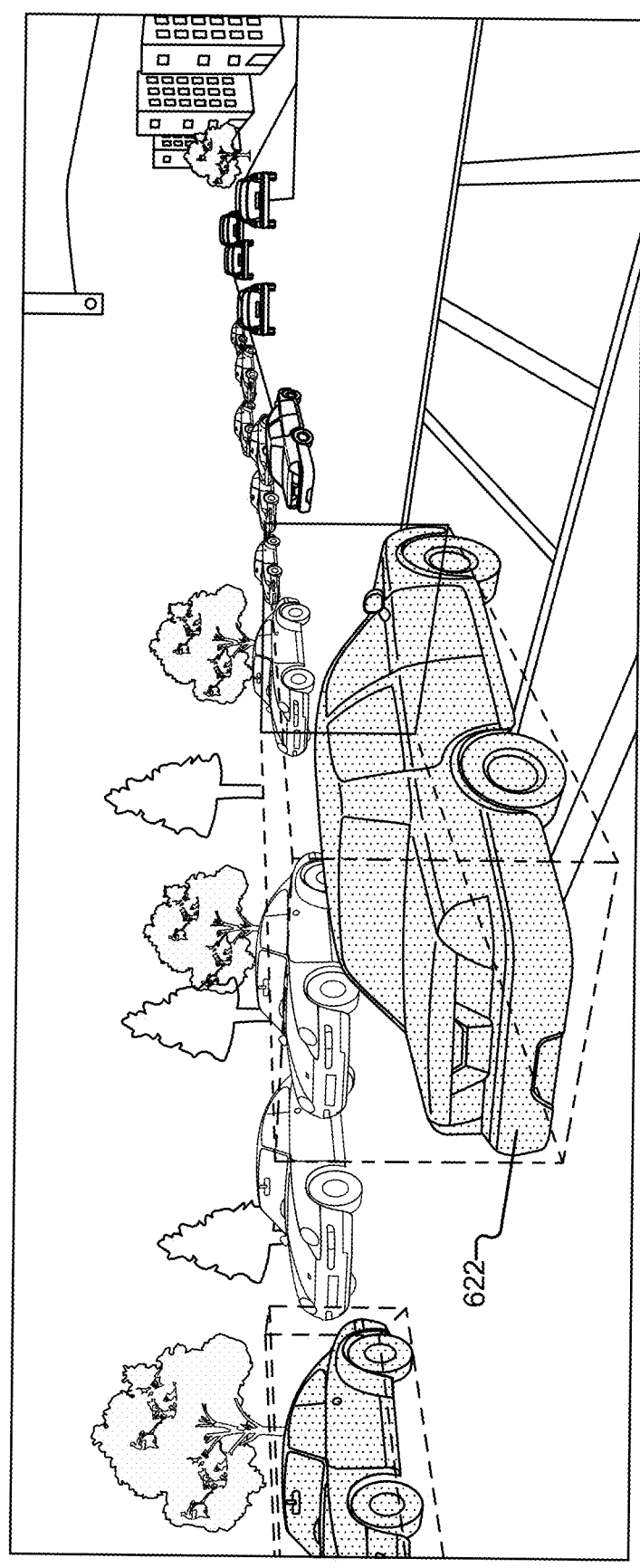

The following are further embodiments of training a model for predicting camera-invariant relative orientation. FIGS. 6A-6C illustrate examples of training samples for training a relative orientation prediction model. Shown in the examples of FIGS. 6A-6C are three different training images (e.g., 2D RGB images). In some embodiments, the training images to train the predictive model are obtained from a desired distribution of images, which has a diversity or distribution in viewing angles, camera parameters such as field of view, focal point, mounting configurations, etc. In some embodiments, synthetic training images may be generated via augmentations such as deriving, from existing images, new images with augmented pitches, simulating rotation of camera recording systems, etc. The labels may also be determined using information from other sensors corresponding to the training images, such as LiDAR information.

In each training image in the examples of FIGS. 6A-6C, a unique object (vehicle in these examples) is identified (e.g., vehicles 602, 612, and 622 of FIGS. 6A, 6B, and 6C, respectively). In the examples of FIGS. 6A-6C, bounding boxes around the vehicles are shown for illustrative purposes. For each identified unique object, the pixels corresponding to the vehicle are identified. Each of the pixels identified as belonging to a vehicle is labeled with a relative orientation (where the labeling of the pixels corresponding to the identified vehicles is indicated by the shading applied to the vehicles in the examples of FIGS. 6A-6C). For example, for a given pixel belonging to a vehicle, the relative orientation a for that vehicle is determined based on its known viewing angle (e.g., based on known camera parameters for the camera) relative to the heading direction of the vehicle.

In some embodiments, the model is implemented using an architecture such as a neural network (other architectures may be utilized to implement the model, as appropriate). The neural network is initialized to a set of initial weights/ parameters. Labeled training images such as those shown in FIGS. 6A-6C, coming from a rich distribution of training samples (e.g., target distribution), are fed to the model. The model makes predictions for all of the pixels in an image. A loss function is then used to evaluate the model's performance by using the loss function to compare the predictions made by the model to the target relative orientation values assigned as labels. In some embodiments, as described above, a mask is used on those pixels in the image that are to be ignored (or otherwise not used) in determining how to update the model. For example, pixels not corresponding to the labeled vehicle objects are assigned values that the loss function and/or parameter updating are configured to ignore.

The parameters of the model are then updated and optimized based on the output of the loss function. Numerous training samples are presented to the model during training time.

The following are further embodiments of utilizing, at inference time, a model for predicting camera-invariant relative orientation. For example, inference-time processing similar to that described above in conjunction with the normalized depth representation prediction and in FIG. 3A is performed. For example, an RGB image is captured by a camera recording system of an ego vehicle at which inference is being performed. In some embodiments, pre-processing such as that described above (e.g., rectification such as resizing) is performed on the raw input image. The prepared image is then inputted to the relative orientation model. The model then makes per-pixel predictions on the (pre-processed) 2D RGB image. A segmentation model is used to determine (e.g., from the same pre-processed image that was passed to the relative orientation model) the pixels in the input image belonging to a unique object. For each of the pixels identified as belonging to a unique object, an absolute orientation value is predicted using that pixel's predicted relative orientation angle and that pixel's viewing angle (e.g., determined based on accessed camera parameters). The per-pixel absolute orientation angles computed for the pixels identified as belonging to the unique object are aggregated to generate or recover a single absolute orientation angle for the object (e.g., relative to the camera coordinate system).

The predicted orientation angle of the object can be used for various types of processing, such as determining a 3D bounding box for the vehicle, including determining which face of the bounding box is in the direction of the vehicle heading (e.g., face corresponding to front of the vehicle if the vehicle is driving in the forward direction). The 3D boxes (with vehicle orientation estimation) are usable for various contexts, such as intent prediction and path planning.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A system, comprising:

a processor configured to:

receive a 2D (two-dimensional) image captured by a camera;

determine, at least in part by using a segmentation model, a plurality of pixels corresponding to a vehicle object in the 2D image;

use a prediction model to determine, for each pixel in the plurality of pixels determined at least in part by using the segmentation model, a corresponding camera invariant distance value comprising a predicted height of a cross-section of the vehicle object that is visible within a given pixel, wherein training the prediction model to produce predictions of camera invariant distance values for input 2D images comprises:

generating, for training images containing vehicles in various distances in relation to an ego vehicle, numerical arrays comprising target camera invariant distance values determined for pixels corresponding to vehicles whose distances are known in the training images, wherein for each pixel corresponding to a unique vehicle, a same target camera invariant distance value is assigned as a label, the same target camera invariant distance value comprising a smallest depth value of the unique vehicle normalized by pixel focal length; and sampling from a plurality of different distances at least in part by separating the numerical arrays generated for the training images containing vehicles in various distances into distinct partitions corresponding to different ranges of distances; and determine an absolute depth estimate of the vehicle object in the 2D image based on:

a focal length of the camera that captured the 2D image; and an aggregation of the predicted heights determined for each of the pixels in the plurality of pixels; and a memory coupled to the processor and configured to provide the processor with instructions.

2. The system of claim 1, wherein the 2D image comprises an RGB image.

3. A method, comprising:

receiving a 2D (two-dimensional) image captured by a camera;

determining, at least in part by using a segmentation model, a plurality of pixels corresponding to a vehicle object in the 2D image;

using a prediction model to determine, for each pixel in the plurality of pixels determined at least in part by using the segmentation model, a corresponding camera invariant distance value comprising a predicted height of a cross-section of the vehicle object that is visible within a given pixel, wherein training the prediction model to produce predictions of camera invariant distance values for input 2D images comprises:

generating, for training images containing vehicles in various distances in relation to an ego vehicle, numerical arrays comprising target camera invariant distance values determined for pixels corresponding to vehicles whose distances are known in the training images, wherein for each pixel corresponding to a unique vehicle, a same target camera invariant distance value is assigned as a label, the same target camera invariant distance value comprising a smallest depth value of the unique vehicle normalized by pixel focal length; and sampling from a plurality of different distances at least in part by separating the numerical arrays generated for the training images containing vehicles in various distances into distinct partitions corresponding to different ranges of distances; and determining an absolute depth estimate of the vehicle object in the 2D image based on:

a focal length of the camera that captured the 2D image; and an aggregation of the predicted heights determined for each of the pixels in the plurality of pixels.

4. The method of claim 3, wherein the 2D image comprises an RGB image.

* * * * *